(12) United States Patent
Tijssen et al.

(10) Patent No.: US 10,671,653 B2
(45) Date of Patent: Jun. 2, 2020

(54) ANALYZING SEARCH QUERIES TO PROVIDE POTENTIAL SEARCH QUERY MODIFICATIONS VIA INTERACTIVE USER-INTERFACES

(71) Applicant: Adobe Inc.

(72) Inventors: Remon Tijssen, Mill Valley, CA (US); Sean Voisen, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 324 days.

(21) Appl. No.: 15/047,478

(22) Filed: Feb. 18, 2016

(65) Prior Publication Data

US 2017/0242913 A1    Aug. 24, 2017

(51) Int. Cl.
| | | |
|---|---|---|
| *G06F 16/332* | (2019.01) | |
| *G06F 16/9032* | (2019.01) | |
| *G06F 16/36* | (2019.01) | |
| *G06F 40/30* | (2020.01) | |
| *G06F 40/247* | (2020.01) | |
| *G06F 40/279* | (2020.01) | |
| *G06F 40/289* | (2020.01) | |

(52) U.S. Cl.
CPC ...... *G06F 16/3325* (2019.01); *G06F 16/3323* (2019.01); *G06F 16/367* (2019.01); *G06F 16/90328* (2019.01); *G06F 40/247* (2020.01); *G06F 40/279* (2020.01); *G06F 40/289* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 2008/0177717 | A1* | 7/2008 | Kumar | G06F 17/3064 |
| 2012/0124071 | A1* | 5/2012 | Gebhard | G06F 17/3097 |
| | | | | 707/767 |
| 2013/0132359 | A1* | 5/2013 | Lee | G06F 17/30867 |
| | | | | 707/706 |
| 2014/0040275 | A1* | 2/2014 | Dang | G06F 17/2785 |
| | | | | 707/741 |
| 2016/0139774 | A1* | 5/2016 | Rivard | G06F 3/04842 |
| | | | | 715/781 |
| 2017/0075877 | A1* | 3/2017 | Lepeltier | G06F 17/2705 |

* cited by examiner

*Primary Examiner* — Thu N Nguyen
(74) *Attorney, Agent, or Firm* — Keller Jolley Preece

(57) ABSTRACT

The present disclosure is directed toward systems and methods for utilizing semantic information in association with a search query. For example, one or more embodiments described herein identify key terms within a search query and utilize semantic information associated with the identified key terms to provide suggested replacement terms. A user can select one or more suggested replacement terms to broaden or refine a search query so as to add more meaning and specificity to the search query. Furthermore, one or more embodiments provide unique and interactive user interfaces to allow users to efficiently refine and improve search queries when using mobile devices with smaller or more limited display and input capabilities.

20 Claims, 14 Drawing Sheets

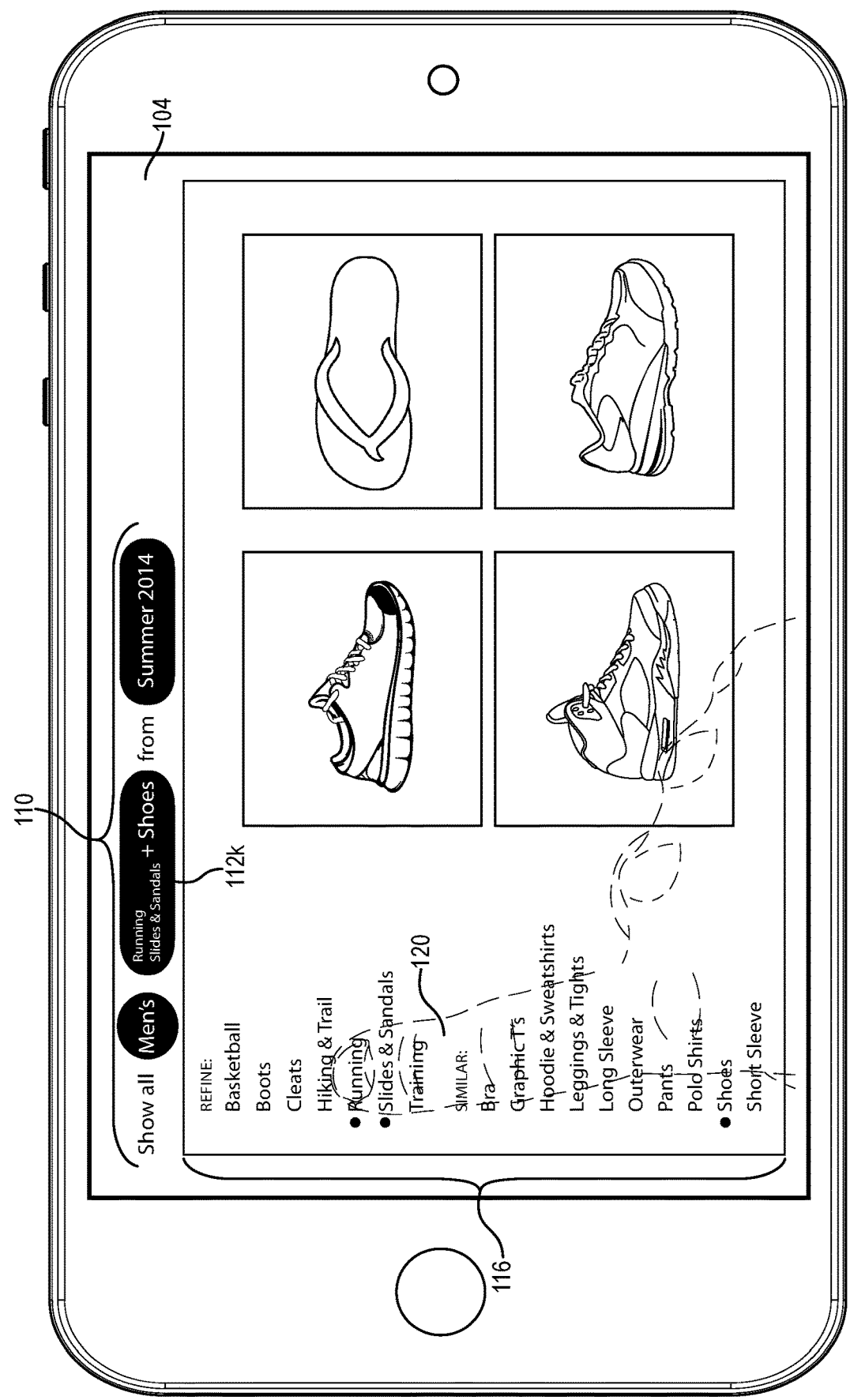

ANALYZING SEARCH QUERIES TO PROVIDE POTENTIAL SEARCH QUERY MODIFICATIONS VIA INTERACTIVE USER-INTERFACES

BACKGROUND

1. Technical Field

One or more embodiments described herein relate generally to expanding and improving search queries. More specifically, one or more embodiments relate to composing intelligent semantic-based expanded search queries and performing searches using such search queries.

2. Background and Relevant Art

Users perform numerous searches on a daily basis. For example, a user may perform Internet searches for restaurant reservations, retail goods, travel directions, business information, news, weather, and so forth. Users generally perform these Internet searches by utilizing one or more Internet search engines that receive a search query from the user and return various results (e.g., hyperlinks and brief descriptions) related to the search query.

Often, a search engine will return search results that include expanded terms. To illustrate, a user may enter a search query into a search engine such as, "best hamburger places in San Francisco." The search engine may return not only search results for highly rated hamburger restaurants in San Francisco, but also other search results related to search terms that are expanded from the terms in the original search query. For example, the search engine may return additional search results including search results related to other types of restaurants and/or restaurants in other locations besides San Francisco.

Typically search engines identify these expanded search results by simply matching the original search query to a large database of historical queries. The search engine then uses this historical data to suggest the most likely and popular expanded results. This approach to identifying expanded search results is problematic in certain contexts. For example, the expanded terms returned by a typical search engine relying on historical data may not be directed at a domain in which the user is actually interested.

For instance, in the above example, the user may not have a car and thus has no interest in any restaurant outside of San Francisco. Accordingly, those expanded search results for restaurants outside of San Francisco are of nominal interest to the user. A user may try to avoid such search results, but the user generally has no way of editing or manipulating the search query beyond simply editing the text of the query. For example, the user may try different word choices within the search query in hopes of narrowing the search results to something that is truly useful to the user, but this approach often wastes the user's time and results in frustration for the user.

Furthermore, additional problems arise for users who are attempting to compose and execute search queries on a mobile device. For example, due to the limited display space on a smart phone or other mobile device, users frequently struggle to input search query terms and revise search queries that are not returning desired results. Additionally, traditional search query composition methods only allow for typed input from a user. For example, users often find it frustrating to type and re-type iterative search queries out using a standard keyboard. The process of typing and re-typing search queries is even more frustrating, time-consuming, and error-filled when the user is utilizing touch gestures on the small display of a mobile device.

Thus, there are several disadvantages to current methods for helpfully manipulating search queries.

SUMMARY

One or more embodiments described herein provide benefits and/or solve one or more of the foregoing or other problems in the art with systems and methods that provide efficient and effective user experiences for editing and manipulating search queries. For example, one or more embodiments include systems and methods that enable a user to quickly edit and manipulate a search query by providing suggested replacement terms based on query semantics. Thus, systems and methods described herein provide the user with suggested replacement terms that enable the user to manipulate a search query in a meaningful way, either as the user is composing the search query or after the search query has been composed.

Furthermore, one or more embodiments described herein provide systems and methods that lead to efficient and effective user experiences for editing and manipulating search queries via a mobile device. For example, one or more embodiments include systems and methods that enable a user to edit and manipulate a search query using touch gestures in addition to typed input. Thus, systems and methods described herein enable the user to quickly and easily edit, manipulate, and execute search queries in connection with the limited display capabilities of a mobile device.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIGS. 1A-1I illustrate a series of graphical user interfaces by way of which a user can enter a search query, select key terms and suggested replacement terms, and review search results in accordance with one or more embodiments;

DETAILED DESCRIPTION

Figure 1A:
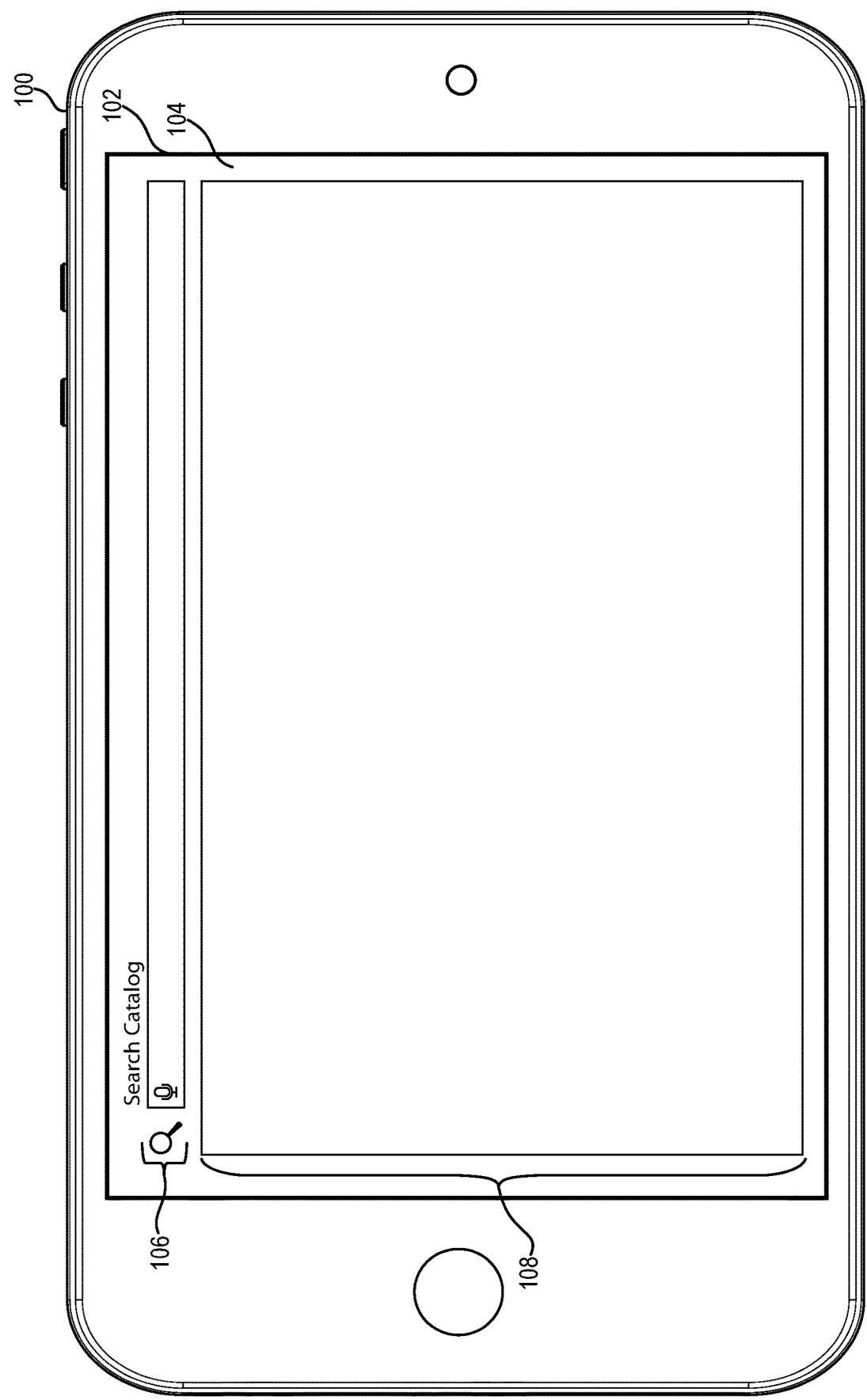

One or more embodiments described herein include a search management system that enables a user to edit and manipulate a search query by utilizing query semantics. For example, the search management system identifies one or more key terms in search query. The search management system identifies various suggested replacement terms based on the key terms and the semantics of the search query. The search management system presents a graphical user interface that allows the user to navigate and select one or more of the various suggested replacement terms for inclusion and/or substitution within the search query. In this way, the search management system enables the user to build a search query that will help return search results that are more germane to the user's intentions for performing the search.

To illustrate, the search management system provides a graphical user interface wherein the user can enter a search query. As the user enters the search query, or after the search query is entered in its totality, the search management system identifies one or more key terms within the search query. For example, in the search query, "best hamburger places in San Francisco," the search management system may identify key terms including, but not necessarily limited to: "best," "hamburger," "best hamburger," "hamburger places," "places," "and "San Francisco."

Once the search management system identifies one or more key terms within the search query or portion of the search query, the search management system next utilizes query semantics to identify query suggested replacement terms in a relational database. In one or more embodiments, a key term has one or more semantically related terms. For example, semantically related terms for any word can include the word's hypernyms, hyponyms, and coordinate terms.

As used herein, a "hypernym" refers to a semantic term that has a superordinate relationship with a key term. For example, the key term "shoes" has hypernyms including terms that cover a broad meaning that the term "shoes" falls under (e.g., "footwear," "apparel," etc.). As used herein, a "hyponym" refers to a semantic term that has a subordinate relationship with a key term. For example, the key term "shoes" has hyponyms including terms that cover more specific meanings of the term "shoes" (e.g., "cleats," "sandals," etc.). As used herein, a "coordinate term" refers to a semantic term that shares a hypernym with a key term. For example, the key term "shoes" has a hypernym "apparel." Accordingly, coordinate terms of "shoes" include other terms that fall under "apparel" (e.g., "shirts," "pants," "jackets," etc.).

Returning to the example, the ontology for the word "hamburger" includes a hypernym "sandwich" (e.g., represents a category that contains "hamburger"), a hyponym "cheese burger" (e.g., a sub-type of "hamburger"), and a coordinate term "grilled cheese" (e.g., a sibling term in the ontological tree; in other words, another type of sandwich). The search management system then provides these semantically related terms as suggested replacement terms in a graphical user interface where the user can select one or more of the suggested replacement terms for inclusion or substitution in the search query. Finally, the search management system performs a search based on the expanded search query. The search management system performs the process of identifying key terms and suggested replacement terms in real-time, such that the user is constantly presented with options for expanding the search query.

As used herein, the "ontology" of a word refers to linguistic categories related to the word. For example, as described above, a word generally belongs to a broader category of which it is a sub-type. The same word is generally related to additional and more specific sub-categories. Along similar lines, the word may have additional words that it is related to via a broader category. These relationships between words and categories of words make up an ontological structure associated with a specific word.

In one or more embodiments, the search management system described herein utilizes databases of words, wherein the words are organized based on ontologies or lexicons. Thus, the utilized databases indicate to the search management system a particular word's super-categories, sub-categories, sibling-categories, and words falling under each of these categories. Furthermore, as will be described in greater detail below, the search management system utilizes or generates word ontologies and semantics via series of user interfaces that quickly and easily enable a user to compose meaningful search queries, even within the limited display space of a mobile device or other similar client-computing device.

The process by which the search management system analyzes and utilizes, in real-time, the semantics of a user's search query will now be described with reference to a series of user interfaces shown in FIGS. 1A-1I. Generally, although FIGS. 1A-1I illustrate an embodiment in which the search management system displays the series of user interfaces on the touch screen of a client-computing device such as a smart phone, tablet, smart wearable, etc., it is understood that the search management system can provide the user interfaces illustrated in FIGS. 1A-1I on a standard display of a client-computing device such as a laptop or desktop computer. Furthermore, while the functionality of the search management system described with reference to FIGS. 1A-1I is described in a context of a native application, in additional embodiments, the functionality of the search management system can apply to network environments. For example, the search management system can provide GUIs as part of a website for display in connection with a web browser.

As illustrated in FIG. 1A, the client-computing device 100 (e.g., a tablet computer), includes a touch screen display 102 that can display user interfaces and by way of which user input may be received or detected. As used herein, a "touch screen display" refers to an input device that includes a display of a client-computing device that is capable of detecting user interactions that a user performs with respect to the display. For example, a user can interact with a client-computing device in the form of touch gestures made with respect to the touch screen display (e.g., tap gestures, swipe gestures, pinch gestures, reverse-pinch gestures, etc.). Additionally, the client-computing device 100 may include any other suitable input device, such as a touch pad, keyboard, mouse, or those described below in reference to FIG. 5.

As briefly described above, a user (e.g., a user of the client-computing device 100) can utilize search management system to input a search query and receive search results. As used herein, a "search query" refers to a string of words that outline the parameters of a search to be performed on a body of data. For example, the search management system can perform a search outlined by a search query made of simple terms (e.g., "yellow hat"). The search management system can also perform a search outlined by a search query constructed of more complex natural language (e.g., "show me all yellow hats available at retailers near me"). In one or more embodiments, search queries also include Boolean operators (e.g., "or," "and," "not," etc.) and other connecting terms.

As shown in FIG. 1A, the search management system provides the search GUI 104 in order to facilitate the user's input, modification, and expansion of a search query, as well as the display of the results of the user's search query. Initially, the search GUI 104 includes a search query input box 106 and a search results box 108. The search query input box 106 displays input received from the user verbally, or via another type of input device (e.g., a keyboard, mouse, touch screen keyboard, stylus, additional touch gestures, etc.).

The search results box 108 displays search results in a variety of display styles. For example, and as will be described in further detail below, the search management system can organize search results within the search results box 108 as selectable text, selectable images, or other types of selectable controls or objects. The search management system organizes search results within the search results box 108. For example, the search management system can organize the search results alphabetically, based on popularity, based on relevancy, and so forth.

It will be understood that the functionality of the search management system is described in FIGS. 1A-1I in connection with a well-defined data set. As used herein, a "well-defined data set" refers to a closed set of datum. For example, a well-defined data set may include an ontological database containing items sold by a retailer. In another example, a well-defined data set may include a library of multimedia items (e.g., digital photographs) stored in a particular location. Generally, as used within this disclosure, a well-defined data set is a domain including information that is ontologically (e.g., hierarchically) organized and semantically related.

As laid out above, a well-defined data set is a collection of data items that are known. For example, a digital catalog collection is considered a well-defined data set. Although the functionality of the search management system is described herein in connection with a well-defined data set, in additional embodiments, the search management system functions in connection with a generalized search (e.g., such as commonly utilized via popular search engines). In the example described through FIGS. 1A-1I, the well-defined data set is an electronic catalog for a sporting goods retailer. Accordingly, each data item within the electronic catalog represents a retail item and is associated with various metadata (e.g., a picture of the item, a description of the item, an item price, inventory information, shipping information, and so forth).

Figure 1B:
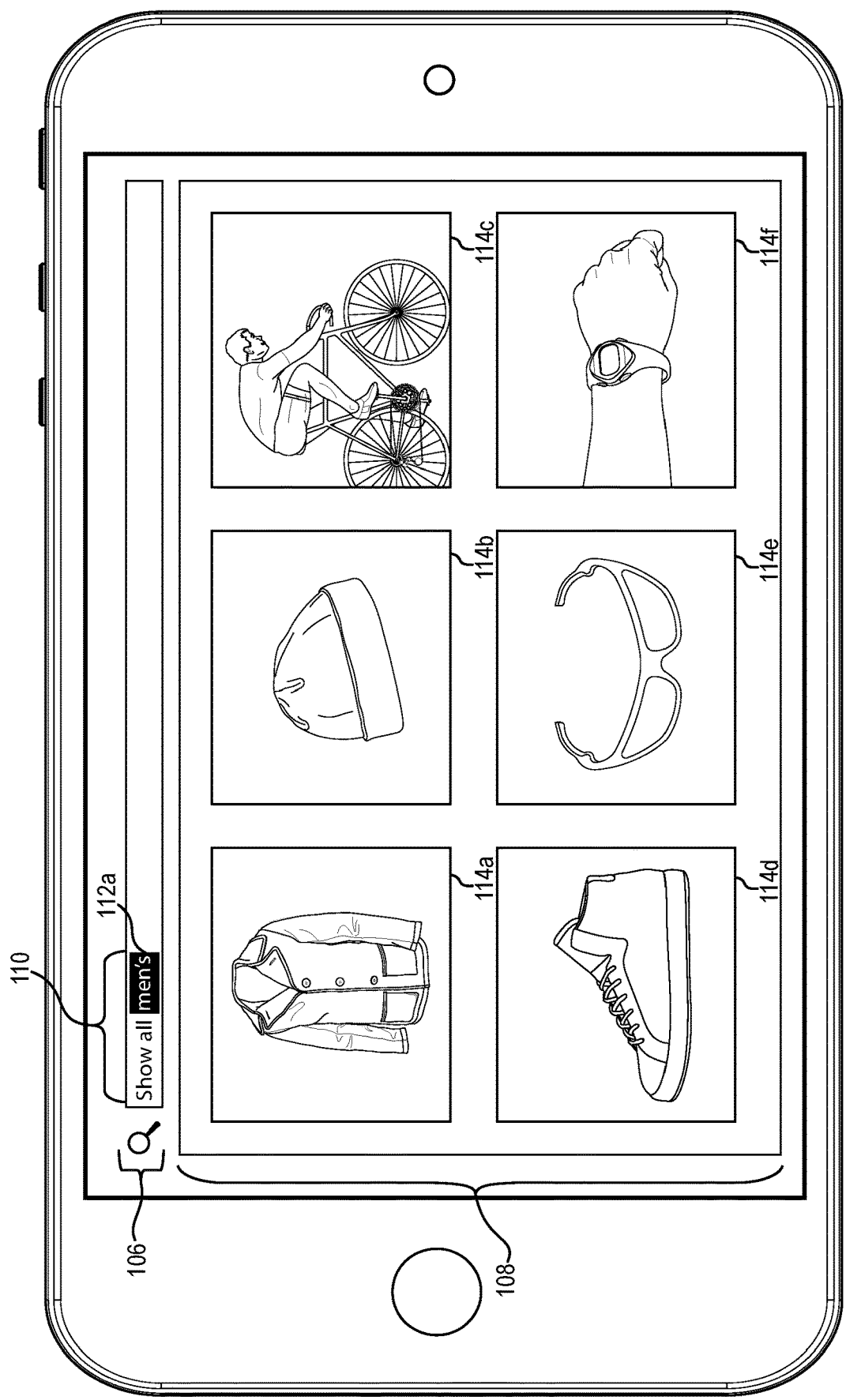

Upon receiving a user's search query input, the search management system adds the user's search query input 112 to the search query input box 106, as shown in FIG. 1B. In one or more embodiments, as mentioned above, the search management system adds the search query input 112 based on voice input from the user or other types of input received from the user. At this point, as the search management system is entering the search query input 110 into the search query input box 106, the search management system also begins analyzing the search query input 110 for one or more key terms.

In order to identify a key term, the search management system utilizes natural language processing to extract parts of speech as well as subject-predicate-object groupings. As used herein, "natural language processing" refers to capabilities of the search management system that allow the search management system to derive meaning from natural language input. For example, in order to process natural language input, the search management system parses strings of characters into words and phrases, and then tags various parts of speech within the parsed input. In some embodiments, utilizing the tagged parts of speech, the search management system then analyzes a sentiment associated with the input, various relationships between entities named in the input (e.g., the relationship between compound words and phrases, such as "basketball shoes"), one or more topics or key terms within the input, and other types of semantic information.

As used herein, the term "semantics" refers to the meaning and/or form of a search query as determined by semantic information analyzed by the search management system. For example, as mentioned above, the search management system utilizes natural language processing to identify topics or key terms within a search query. The search management system then analyzes semantic information association with the identified topics or key terms to derive further meaning from the search query. To illustrate, if a key term is "shoes," the search management system can analyze semantic information associated with the term "shoes" to determine that "shoes" are a type of "apparel" and include multiple subtypes such as "running shoes," "cleats," "hiking shoes," and so forth. Semantic information can include hypernyms, hyponyms, and coordinate terms.

For example, as shown in FIG. 1B, the search management system utilizes natural language processing on the search query input 110 (e.g., "Show all men's") to identify various parts of speech within the search query input 110. To illustrate, the search management system determines "show" is a verb, while "men's" is an adjective and "all" is an article. In one or more embodiments, the search management system utilizes certain parts of speech in identifying and assigning key terms. Accordingly, in one or more embodiments, the search management system determines that the adjective "men's" is the only suitable word in the search query input 110 to assign as a key term because the verb and article included in the search query input 110 would not be helpful in identifying results.

The search management system identifies key terms within search query inputs based on natural language processing in combination with other various methods. For example, in some embodiments, the search management system applies rules or grammars to search query inputs in order to identify key terms within the represented parts of speech. In other embodiments, the search management system utilizes neural networks or machine learning to intelligently identify key terms within a search query input. The search management system can also utilize database searches or internet searches in order to identify key terms within a search query input. In at least one embodiment, the search management system accepts user input such that the user can manually indicate (e.g., via a press-and-hold touch gesture, etc.) that the user would like a particular word or phrase within the search query to be treated as a key term by the search management system.

In response to identifying the word "men's" as a key term 112a in the search query input 110, as shown in FIG. 1B, the search management system adds an indicator to the key term 112a. For example, as shown in FIG. 1B, the search management system highlights the key term 112a to indicate to the user that the word "men's" is a key term available for expansion. In additional or alternative embodiments, the search management system can indicate key terms as such in other ways. For example, the search management system can underline key terms, change text colors of key terms, change fonts of key terms, add background colors or patterns behind key terms, add animations to key terms, and so forth.

Additionally, in response to identifying the key term 112 in the search query input 110, as shown in FIG. 1B, the search management system returns search results within the search result box 108. In one or more embodiments, the search management system executes a search query in real-time as the search query is being entered into the search query input box 106 regardless of whether the search query input 110 is incomplete or complete. As the user continues to add to the search query input 110, the search management system updates the search and the search results. In additional or alternative embodiments, the search management system may not execute the search until the user indicates that the search query 110 is complete.

As illustrated in FIG. 1B, in response to the user entering the partial search query "Show all men's," the search management system executes an initial search in real-time. Furthermore, in response to the executed initial search, the search management system displays search results within the search results box 108. As shown in FIG. 1B, the search management system displays one or more search result controls 114a-114f within the search results box 108.

In one or more embodiments, each search result control 114a-114f is a selectable control or object that, when selected, provides additional information related to a particular product returned by the search management system in response to the executed search query. For example, in response to the user selecting the search result control 114a, the search management system provides additional information, either within the search results box 108 or within a separate GUI, including metadata related to the product illustrated by the search result control 114a (e.g., the product's name, description, price information, shipping information, inventory information, etc.).

It will be understood that in at least one embodiment, the search management system dynamically and constantly updates the executed search upon each new entry into the search query input box 106. For example, as shown in FIG. 1B, the search management system identified the search results associated with the search result controls 114a-114f in response to the user typing in a partial search query. As the user adds additional terms to the search query input box 106, the search management system will continue to update the search results in a manner corresponding to the terms in the search query input box 106.

In addition to updating the search results, the search management system also updates the analysis of the terms entered into the search query input box 106 after each new addition to the search query input box 106. For example, if the first term entered into the search query input box 106 were "basketball," the search management system's initial analysis of that term would identify "basketball" as a noun. Accordingly, the search management system would return search result that could include a basketball and other types of balls and sporting equipment. Furthermore, any determined replacement terms would be determined in relation to the use of the term basketball as a noun. If the next term added to the search query input box 106 is "shoes," the search management system would update its analysis of the word "basketball" to now treat "basketball" as an adjective. It follows that the search management system would update the search results to include basketball shoes and other types of athletic shoes. Furthermore, any determined replacement terms would be determined in relation to the use of the term basketball as an adjective. The search management system updates its search query term analysis based not only on parts of speech, but on any other basis of analysis described herein.

Figure 1C:
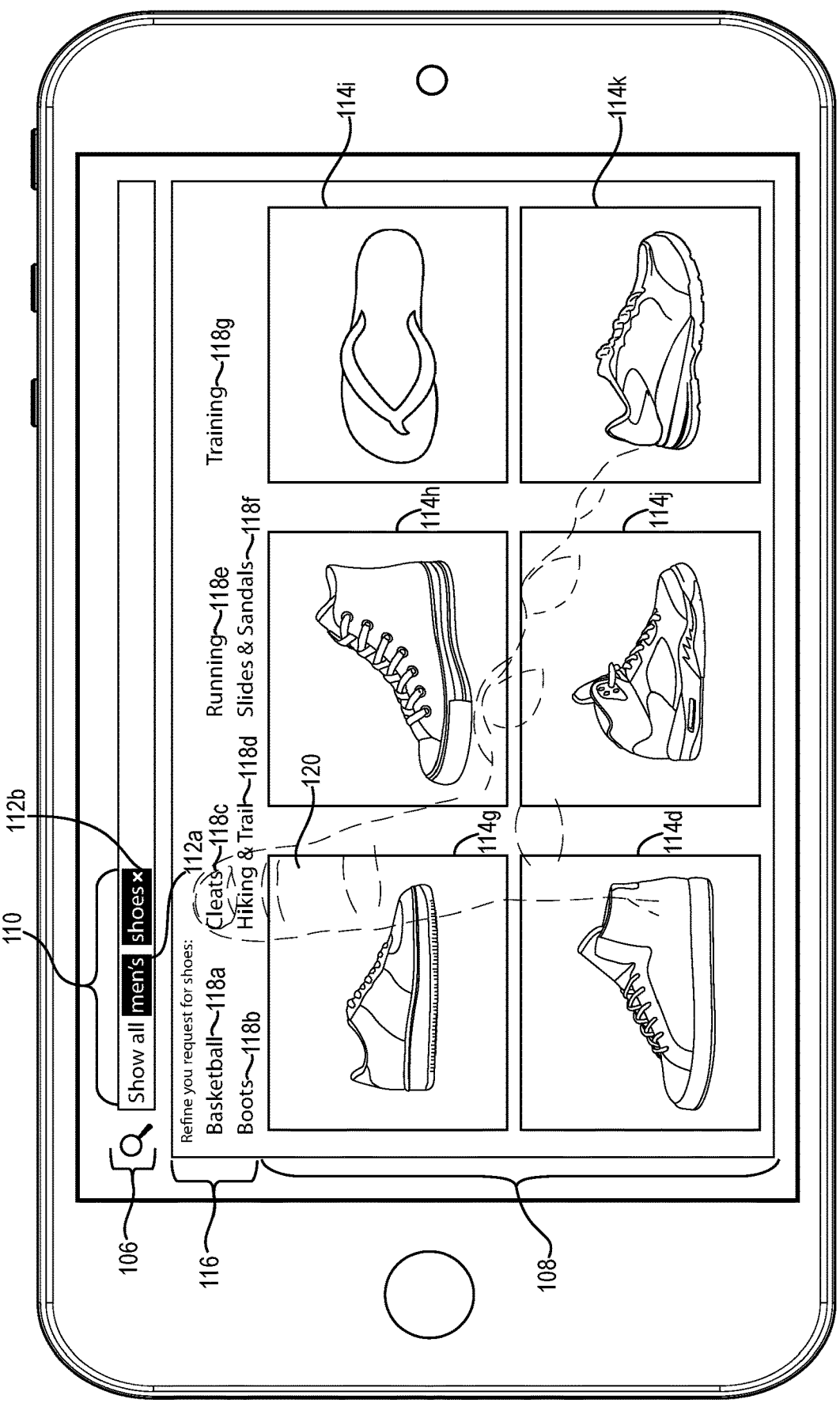

As the user continues to add words to the search query input 110, the search management system continues to identify key terms, and update and refine the search results displayed within the search results box 108. For example, as shown in FIG. 1C, in response to the user adding the word "shoes" to the search query input 110, the search management system updates the executed search to focus only on men's shoes. Accordingly, the search management system updates the displayed search results controls such that the search results controls 114a, 114b, 114c, 114e, and 114f are removed as they are not "men's shoes," and the search results controls 114g, 114h, 114i, 114j, and 114k are added, as shown in FIG. 1C.

As briefly described above, the search management system analyzes identified key terms within a search query and provides suggested replacement terms for the identified key terms based on semantic information associated with the search query. As used herein, the term "expansion suggestion" refers to one or more terms identified by the search management system during analysis of semantic information associated with a particular key term. As such, suggested replacement terms for a key term can include hypernyms, hyponyms, and coordinate terms related to the key term. In one or more embodiments, the search management system can utilize selected suggested replacement terms to either replace or use in association with the key term.

For example, as illustrated in FIG. 1C, in response to the user adding the word "shoes" to the search query input 110 within the search query input box 106, the search management system will analyze the search query input 110 to determine that "men's" and "shoes" are key terms. The search management system determines that particular words or phrases within the search query input 110 are key terms by utilizing natural language processing, as described above. Next, the search management system utilizes semantic information associated with the search query input 110 to identify one or more suggested replacement terms.

The process by which the search management system utilizes semantic information associated with a search query to identify suggested replacement terms begins with the search management system utilizing natural language processing to extract modifier/term pairs from the search query input 110. For example, a modifier/term pair generally refers to an adjective-noun pair or an adverb-verb pair. Thus, "men's shoes" is an adjective-noun pair from which the search management system can identify semantically related terms.

As described above, semantically related terms for a modifier/term pair can include hypernyms, hyponyms, coordinate terms, and other types of semantically related terms. Accordingly, in response to the search management system identifying the adjective-noun pair, "men's shoes," the search management system can automatically identify hypernyms, hyponyms, and coordinate terms related to "men's shoes." For example, as shown in FIG. 1C, the search management system provides an expansion suggestion area 116 adjacent to the search results box 108 that includes a plurality of expansion suggestion controls 118a-118g. In one or more embodiments, each of the expansion suggestion controls 118a-118g is selectable, alone or in combination with other expansion suggestion controls.

Figure 1D:
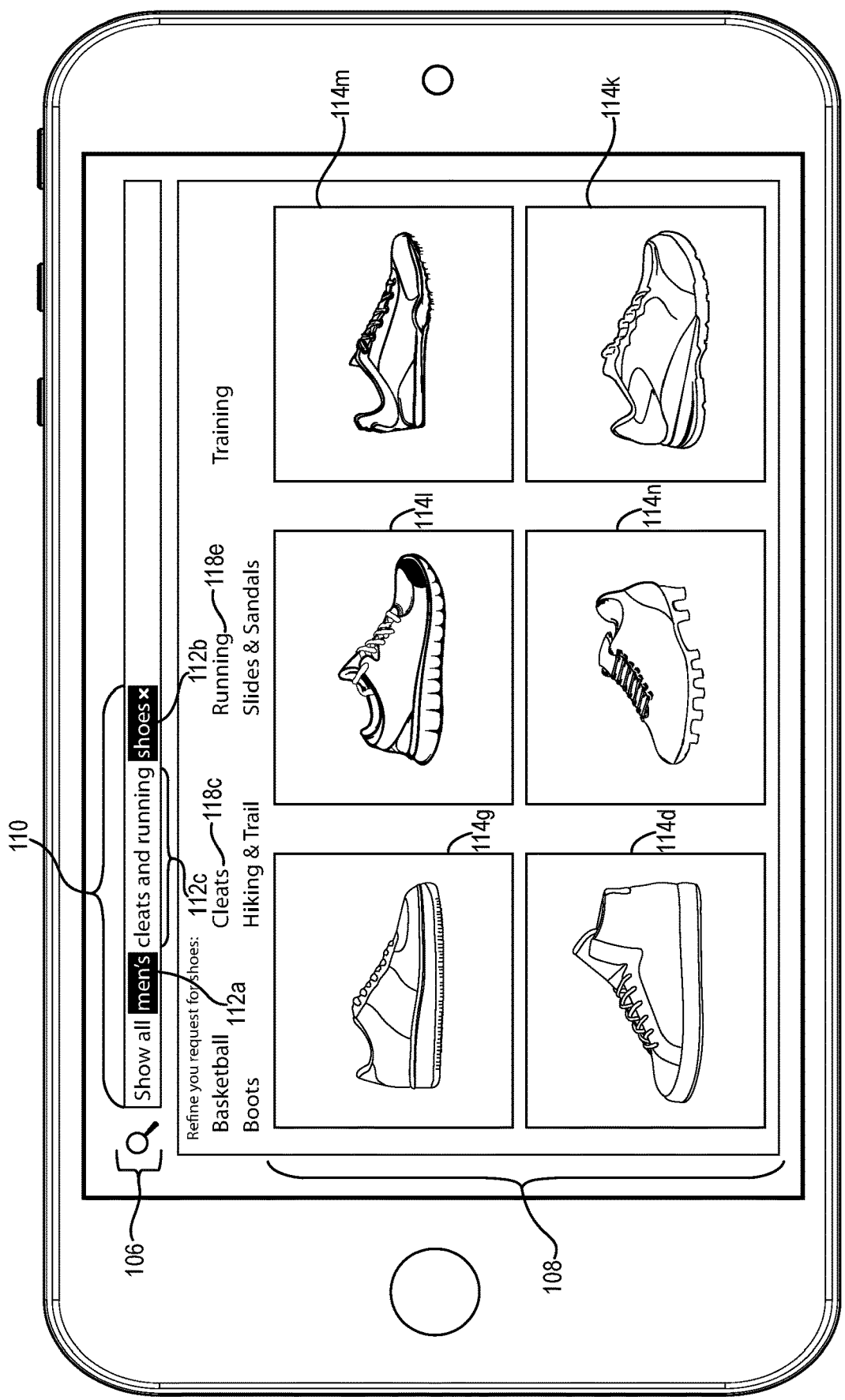

In response to the user selecting one or more of the suggested replacement terms controls (e.g., such as via a touch gesture with a finger 120, as shown in FIG. 1C), the search management system can expand the search query input 110 based on the selected one or more expansion suggestion controls. For example, as shown in FIGS. 1D and 1n response to the user selecting the expansion suggestion controls 118c and 118e, the search management system expands the search query input 110 based on the selected expansion suggestion controls.

In order to expand a search query based on selected expansion suggestion controls, the search management system utilizes natural language processing along with additional grammars and rules to maintain the readability and flow of the search query. For example, as illustrated in FIG. 1D, in response to the user selecting the expansion suggestion control 118c (e.g., "cleats") and the expansion suggestion control 118e (e.g., "running"), the search management system adds a new key terms 112c (e.g., "cleats and running") to the search query input 110. As shown, the search management system adds the new key terms 112c to the search query input 110 intelligently, rather than simply adding the selected suggested replacement terms to the end of the search query. In other words, the search management system adds a new key term to a search query input in such a way that the natural language of the search query is maintained. The search management system can utilize natural language processing, machine learning, and so forth in order to maintain the readability and flow of the search query.

When more than one expansion suggestion is selected, the search management system constructs the associated key term (e.g., the key term 112c) to include appropriate concatenations or connectors (e.g., "and," "or," "not," etc.). In at least one embodiment, the user can indicate the desired connector via touch gesture (e.g., simply tapping suggested replacement terms indicates concatenation with "and," a tap on one expansion suggestion and a swipe on another expansion suggestion indicates concatenation with "not," etc.). Alternatively, the search management system can provide a GUI control within the expansion suggestion area 116 by which the user can simply select the desired concatenation or connector.

In response to the user's expansion suggestion selections, the search management system also updates the search results displayed within the search results box 108. As shown in FIG. 1D, the search management system updates the search results box 108 to include only search results that are "men's cleats and running shoes." Accordingly, the search management system removes the search results controls 114h, 114i, and 114j, and adds new search results controls 114l, 114m, and 114k.

Additionally, in response to the selection and addition of suggested replacement terms cleats and running shoes, the search management system removes the term "men's" from the search query and replace "men's" with cleats and running shoes. Furthermore, the search management system can further refine or identify more specific suggested replacement terms upon selection of a first replacement term. For example, returning to FIG. 1B, upon a user selecting the identified key term "men's", the search management system may present suggested replacement terms on the same level of the ontology of the database being searched. In particular, the search management system can present women's, children's, boys', girls' as suggested replacement terms. Optionally, the search management system can also present terms from adjacent levels of the ontology of the database being searched as suggested replacement terms. Specifically, in this example, the search management system could present athletic, dress, formal, etc. as suggested replacement terms. Upon selection of a replacement term, such as athletic, the search management system can identify new replacement terms that are more specific (i.e., on a lower level of the ontology) such as basketball, soccer, hiking, running, etc.

As discussed above, semantically related terms can include any number of different types of terms (e.g., hypernyms, hyponyms, coordinate terms, etc.). The search management system is described with reference to FIGS. 1C and 1D as providing expansion suggestion controls that are directed at hyponyms (e.g., sub-types). In at least one embodiment, the search management system can provide all different types of semantically related terms at the same time within the expansion suggestion area 116 (see FIG. 1I below). Alternatively, the search management system can provide different types of semantically related terms in response to different types of user interactions with one or more key terms within the search query input 110.

Figure 1E:
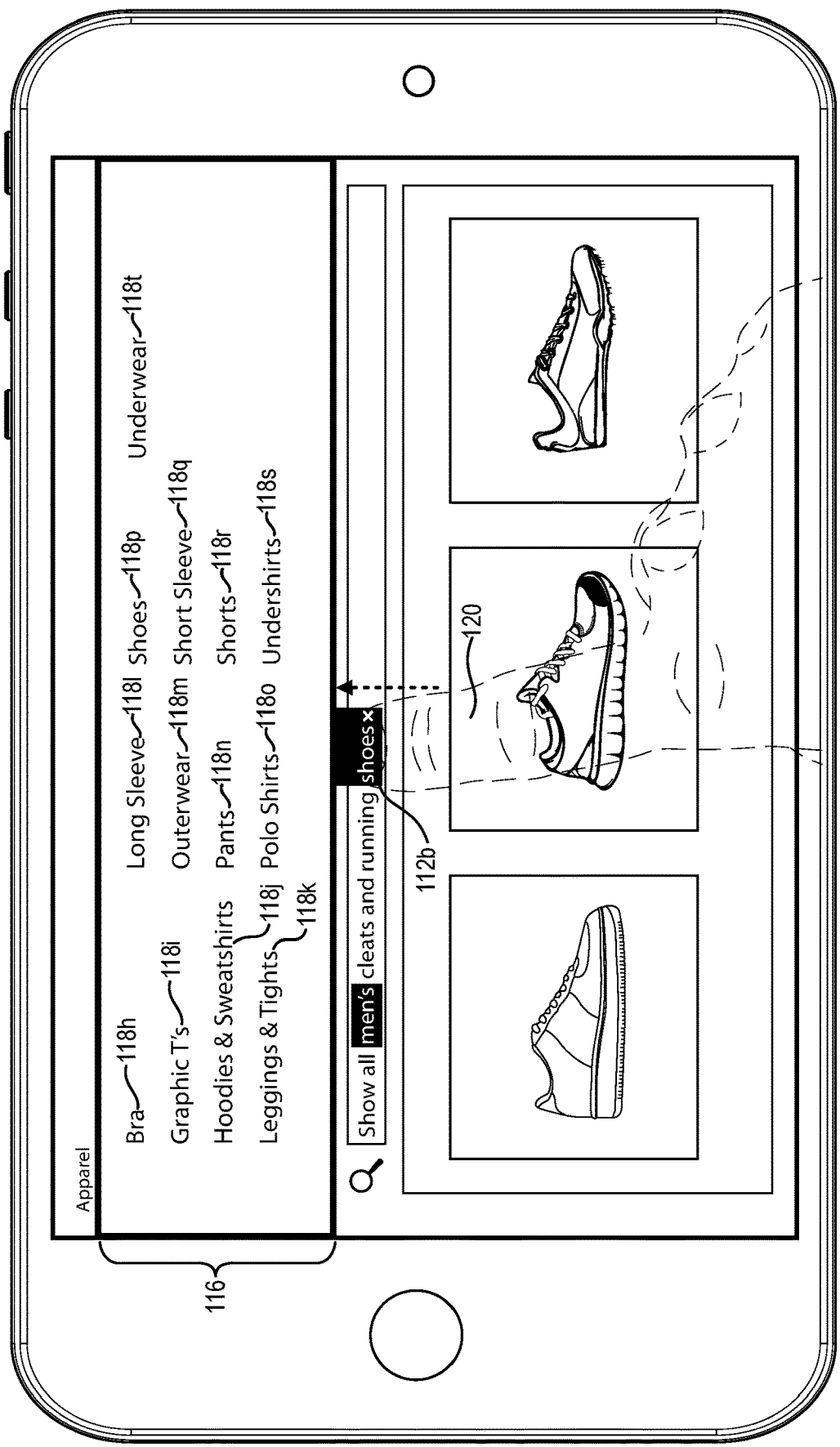

For example, as shown in FIG. 1E, in response to an upward swipe starting at the key term 112b by the user's finger 120 along the indicated arrow, the search management system can identifying a hypernym of the key term 112b and provide expansion suggestion controls that are associated with coordinate terms of the key term 112b. As discussed above, a hypernym represents a super-class associated with a key term, while a coordinate term represents other sub-classes associated with the key term's hypernym. Accordingly, in response to the swipe selection of the key term 112b, the search management system can identify "apparel" as a hypernym for the key term "shoes," and provide suggested replacement terms that are coordinate terms associated with "apparel." For example, as illustrated in FIG. 1E, the search management system provides expansion suggestion controls 118h-118t that each represent a sub-class of "apparel."

In at least one embodiment, the search management system provides semantically related terms depending on touch gestures utilized in connection with one or more key terms within the search query input 110. For example, rather than providing coordinate terms of the key term 112b in response to an upward swipe, the search management system can provide hypernyms of the key term 112b in response to an upward swipe. Then, in response to a tap on one of the displayed hypernyms, the search management system can provide coordinate terms of the key term 112b related through the selected hypernym. Additionally, in one or more embodiments, the search management system may provide hyponyms of the key term 112b in response to a downward swipe, rather than in response to a tap (e.g., as described with reference to FIGS. 1B and 1C).

In response to the user's selection of any of the expansion suggestion controls 118h-118t, as shown in FIG. 1E, the search management system can appropriately concatenate a new key term into the search query input 110, as described above with reference to FIG. 1D. Alternatively, in response to the user's selection of any of the expansion suggestion controls 118h-118t, the search management system can update the expansion suggestion area 116 with further suggested replacement terms semantically related to the selected expansion suggestion control (e.g., hyponyms of the selected expansion suggestion control). Additionally, in response to the user's selection of any of the expansion suggestion controls 118h-118t, the search management system will update the displayed search results, as discussed above.

Figure 1F:
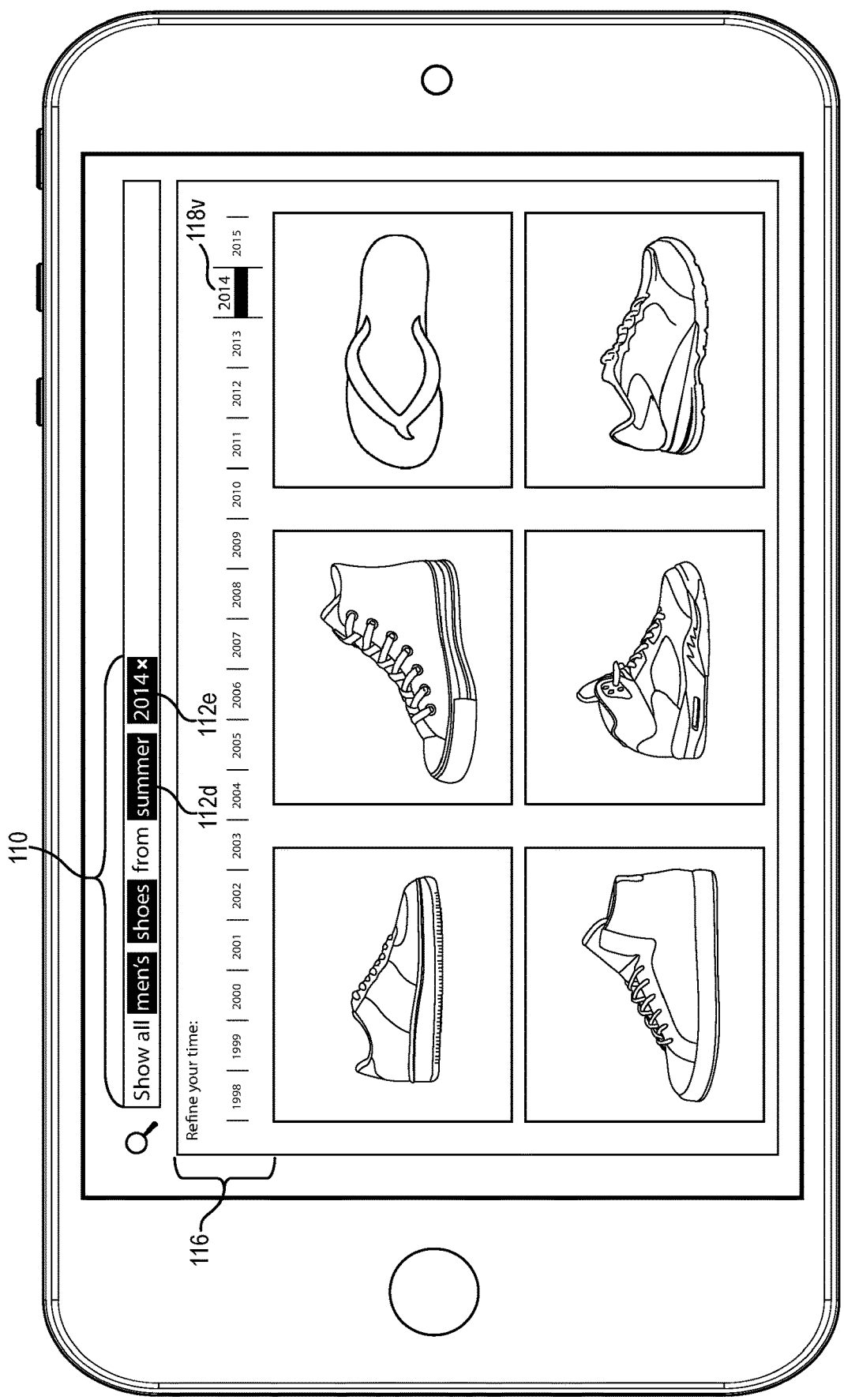

The search management system can also provide suggested replacement terms based on other criteria besides semantic information. For example, as shown in FIG. 1F, the search management system may be working in connection with a chronologically organized data set, such as a yearly catalog. Accordingly, in response to the user updating the search query input 110 to include "from summer 2014," the search management system can identify "summer" as key term 112d, and "2014" as key term 112e. Following this, the search management provides suggested replacement terms within the expansion suggestion area 116 that allow the user to expand or change the chronological restraints associated with the search query input 110.

Figure 1G:
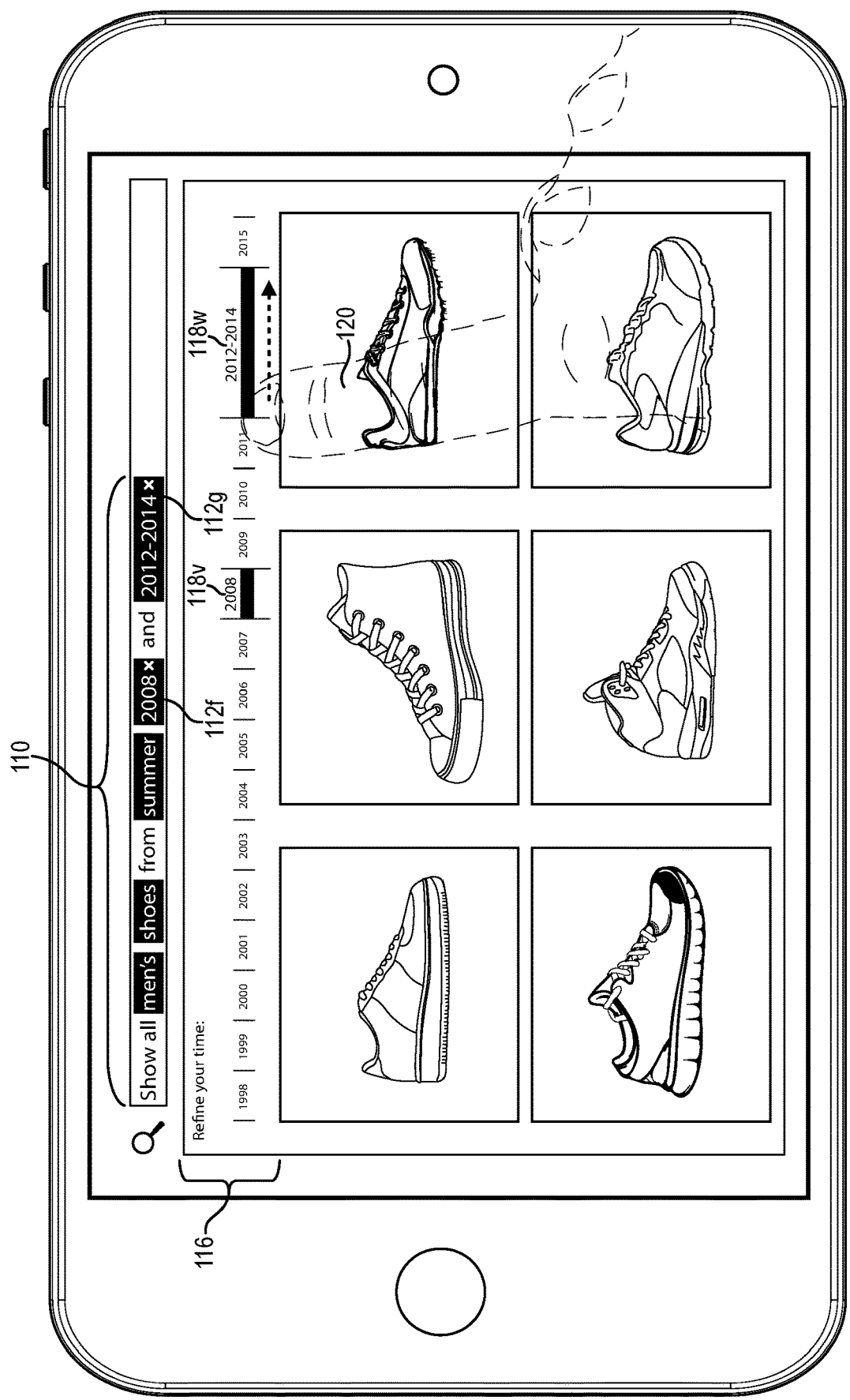

For instance, as shown in FIG. 1F, in response to identifying the key terms 112d and 112e in the search query input 110, the search management system provides a timeline in the expansion suggestion area 116 with the expansion suggestion control 118v (e.g., the year 2014) highlighted. The user can then tap the expansion suggestion control 118v to toggle the year "2014" on and off within the search query input 110. Additionally, as shown in FIG. 1G, the user can tap another expansion suggestion control 118v (e.g., "2008") to add a different year to the search query input 110. Also, as shown in FIG. 1G, in response to a slide gesture across multiple suggested replacement terms, as demonstrated by the user's finger 120, the search management system can group several years into a single expansion suggestion control 118w. As described above, in response to the user selecting multiple expansion suggestion controls within the expansion suggestion area 116, the search management system can add and appropriately concatenate the new key terms 112f and 112g to the search query input 110 so as to maintain linguistic and grammatical correctness and readability.

Figure 1H:
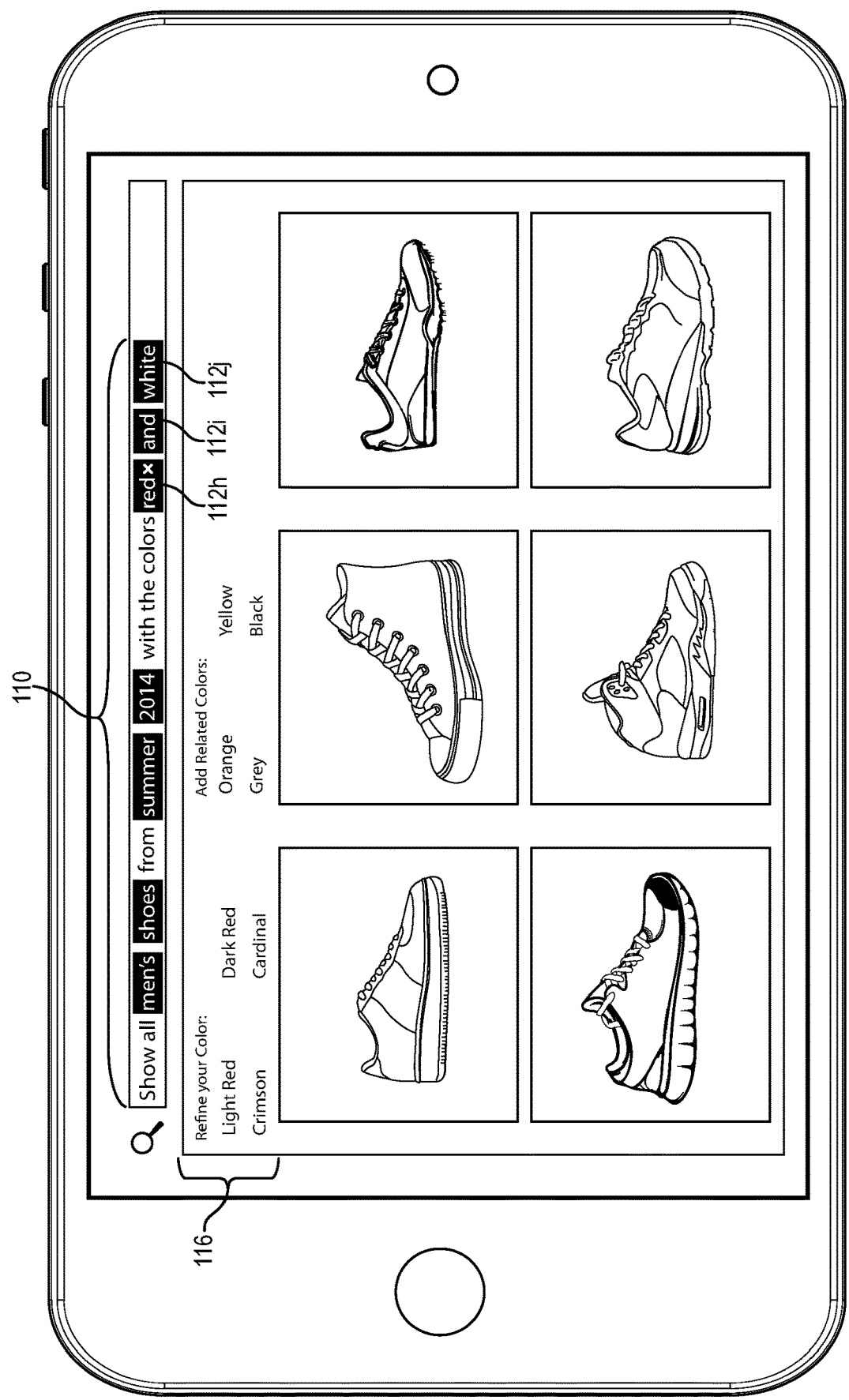

In addition to providing timeline based suggested replacement terms, the search management system can also provide suggested replacement terms based on the semantics of standard descriptors. For example, as illustrated in FIG. 1H, the search management system can utilize key term analysis, as described above, to identify the key terms 112h-112j. In response to determining that the key terms 112h-112j are related to color selections, the search management system provides suggested replacement terms within the expansion suggestion area 116 that include hyponyms of the colors identified within the key terms 112h-112j (e.g., "light red," "dark red," "crimson," and "cardinal" are all sub-types of the key term 112h) as well as coordinate terms (e.g., "orange," "yellow," "grey," and "black" are all other types of colors besides those identified by the key terms 112h and 112j).

The user may delete the existing key terms 112h-122j from the search query input 110 (e.g., by tapping on an "x" associated with each key term), and add new color suggested replacement terms by tapping on any of the colors listed in the expansion suggestion area 116. Alternatively, the user can add additional color suggested replacement terms to the search query input 110 by simply tapping on any of the suggested replacement terms listed in the expansion suggestion area 116. Although FIG. 1H displays the suggested replacement terms in the expansion suggestion area 116 as selectable words, in other embodiments, the search management system provides the suggested replacement terms as interactive color swatches. Additionally, in at least one embodiment, the search management system provides the suggested replacement terms based on a color analysis of the most recent search results, in addition to an analysis of the semantic information associated with the search query input 110.

In additional embodiments, the search management system provides additional visual organization within the search GUI 104. For example, as shown in FIG. 1I, the search management system can group related key terms into a single key term 112k within the search query input 110. Thus, in response to the user selecting the key term 112k, the search management system provides hyponyms (e.g., under the heading "Refine:" in the expansion suggestion area 116) as well as coordinating terms (e.g., under the heading "Similar:" in the expansion suggestion area 116) related to all the terms included in the key term 112k. In at least one embodiment, in response to the user selecting a coordinating terms from the expansion suggestion area 116, the search management system updates the displayed hyponyms to other terms related to the selected coordinating term.

Although the functionality and features of the search management system have been described through FIGS. 1A-1I with regard to a product database, the same functionality and features are applicable to other applications. In another example, the search management system functions with a digital photo library, where each stored digital photo is associated with metadata describing and categorizing the photo. In that case, in response to a user's search query, the search management system identifies one or more key terms within the search query and utilizes semantic information to identify one or more digital photos that respond to the search query. Regardless of the data set queried by the search management system, the search management system utilizes natural language processing to extract meaning from a search query input and to identify responding data items in the associated data set. Additionally, in some embodiments, the search management system can further utilize image analysis, optical character recognition ("OCR"), facial recognition, and any other available technique to extract further metadata from a set of possible search results. In one or more embodiments, the search management system can use this metadata to further inform the ontology associated with the search query input.

Figure 2:
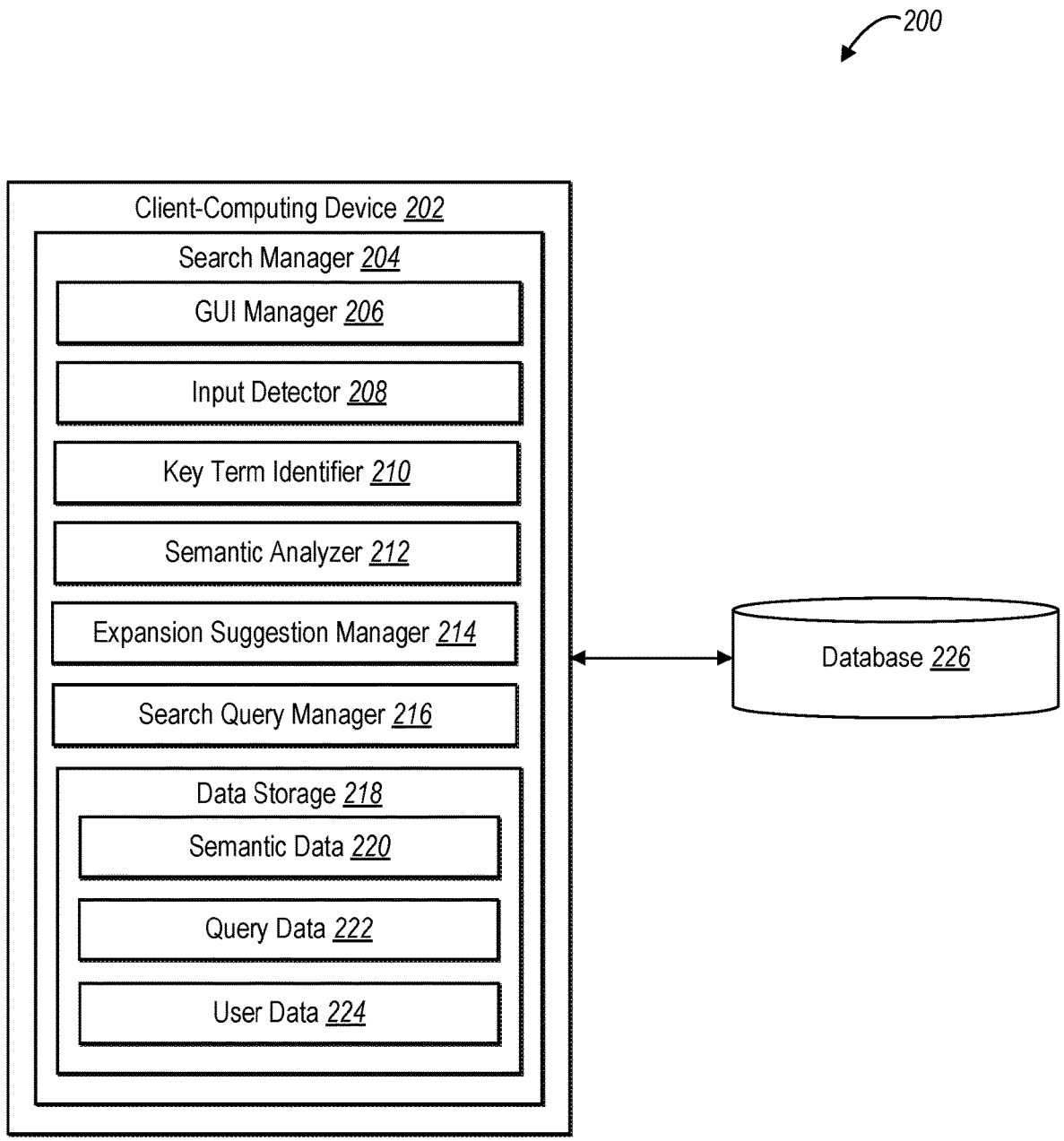
FIG. 2 illustrates a schematic diagram of an example architecture of a search management system in accordance with one or more embodiments.

FIGS. 1A-1I and their related descriptions detail the functions and features of the search management system with regard to a series of user interfaces with which a user can interact. FIG. 1 illustrates an example architecture for the search management system 200. The search management system 200 enables users to utilize semantic information related to a search query to expand the search query in meaningful ways. For example, as shown in FIG. 2, the search management system 200 includes a search manager 204 installed on a client-computing device 202 (e.g., such as the client-computing device 100 illustrated in FIGS. 1A-1I). The search manager 204 includes, but is not limited to, a GUI manager 206, an input detector 208, a key term identifier 210, a semantic analyzer 212, an expansion suggestion manager 214, a search query manager 216, and a data storage 218. Also as shown in FIG. 2, the search manager 204 may be communicatively coupled with a database 226.

Although the disclosure herein shows the components 202-226 to be separate in FIG. 2, any of the components 202-226 may be combined into fewer components, such as into a single facility or module, or divided into more components as may serve one or more embodiments. In addition, the components 202-226 may be located on, or implemented by, one or more computing devices, such as those described below in relation to FIG. 5.

In at least one embodiment, the client-computing device 202 is associated with a user who is composing and executing a search query (e.g., as described in FIGS. 1A-1I). In one or more embodiments, the search manager 204 is a native application installed on the client-computing device 202. For instance, the search manager 204 may be a mobile application that installs and runs on a client device with a touch screen, such as a smart phone or a tablet. Alternatively, the search management system 200 can run on a non-touch screen enabled device.

Thus, the client-computing device 202 can be any type of computing device (e.g., a desktop or a laptop), but is, in one or more embodiments, a handheld device such as a tablet, a smart phone, a personal digital assistant, a smart wearable (e.g., a smart watch or enhanced eyewear), etc. In additional or alternative embodiments, the search manager 204 is a desktop application, widget, or other form of a native computing program. Alternatively, the search manager 204 is be a remote application accessed by the client-computing device 202 over a network, or may be a web application that is executed with a web browser of the client-computing device 202 and supported by a remote web server.

In one or more embodiments, the components 204-226 comprise software, hardware, or both. For example, the components 204-226 can comprise computing instructions stored on a non-transitory computer-readable storage medium and executable by at least one processor of the client-computing device 202. When executed by the at least one processor, the computer-executable instructions cause the client-computing device 202 to perform the methods and processes described herein. Alternatively, the components 204-226 can comprise hardware, such as a special purpose processing device to perform a certain function or group of functions. Additionally, the components 204-226 can comprise a combination of computer-executable instructions and hardware.

As mentioned above, and a shown in FIG. 2, the search manager 204 includes a GUI manager 206. The GUI manager 206 provides, manages, or controls a graphical user interface (or simply "user interface") that allows a user to enter search queries, select suggested replacement terms, and review search results. For example, the GUI manager 206 provides a user interface that facilitates interactions with a display. Likewise, the GUI manager 206 provides a user interface that displays information received from the search manager 204.

More specifically, the GUI manager 206 facilitates the display of a user interface (e.g., by way of a display device associated with the client-computing device 202). For example, the user interface composes a plurality of graphical components, objects, or elements that allow a user to interact with the search manager 204. More particularly, the GUI manager 206 directs the client-computing device 202 to display a group of graphical components, objects or elements as directed by the search manager 204, as will be described further below.

As further illustrated in FIG. 2, the search manager 204 includes an input detector 208. In one or more embodiments, the input detector 208 detects, receives, or facilitates user input in any suitable manner. In some examples, the input detector 208 detects one or more user interactions with respect to the user interface. As referred to herein, a "user interaction" means a single interaction, or combination of interactions, received from a user by way of one or more input devices.

For example, the input detector 208 detects a user interaction from a keyboard, mouse, touch pad, touch screen, a microphone, or any other input device. In the event the client-computing device 202 includes a touch screen, the input detector 208 can detect one or more touch gestures (e.g., swipe gestures, tap gestures, pinch gestures, or reverse pinch gestures) that form a user interaction. In some examples, a user provides the touch gestures in relation to, or directed at, one or more graphical objects or graphical elements of a user interface. Also in some examples, the client-computing device 202 includes a microphone. In that case, the input detector 208 can use voice translation technology in order to utilize user voice inputs.

The input detector 208 may additionally, or alternatively, receive data representative of a user interaction. For example, the input detector 208 may receive one or more user configurable parameters from a user, one or more user commands from the user, or any other suitable user input. The input detector 208 may receive input data from one or more components of the search manager 204, from the data storage 218 of the client-computing device 202, or from one or more remote locations (e.g., the database 226).

The search manager 204 can perform one or more functions in response to the input detector 208 detecting user input or receiving other data. Generally, a user can control, navigate, and otherwise use the search manager 204 by providing one or more user inputs that the input detector 208 detects. For example, in response to the input detector 208 detecting user input, one or more components of the search manager 204 allow the user to view data, interact with various controls, or submit search queries.

In one or more embodiments, in response to the input detector 208 detecting one or more user inputs, the search manager 204 assists the user in composing, expanding, and executing search queries. For example, a user may provide input (e.g., via voice input, manual input, etc.) representative of a search query. In response to the input detector 208 detecting the input, the search manager 204 can being identifying key terms in the search query and identifying semantic information, as described above.

As mentioned above, and as illustrated in FIG. 2, the search manager 204 includes a key term identifier 210. In one or more embodiments, the key term identifier 210 identifies one or more key terms in a received search query input (e.g., the search query input 110, as discussed with reference to FIGS. 1A-1I). As described above, the key term identifier 210 identifies key terms in partial search query inputs or in complete search query inputs. Thus, in one embodiment, the key term identifier 210 is automatically triggered upon receipt of each new word or characterin a search query input. In another embodiment, the key term identifier 210 is triggered upon an indication from a user that the search query input is complete.

Additionally, the key term identifier 210 identifies key terms that include single words (e.g., "men's") or multiple words (e.g., "men's shoes"). Further, as described above, the key term identifier 210 identifies key terms by utilizing natural language processing to extract parts of speech as well as subject-predicate-object groupings. The key term identifier 210 then further utilizes natural language processing to extract modifier/term pairs (e.g., such as adjective-noun pairs, or adverb-verb pairs) from the identified parts of speech or subject-predicate-object groupings. In one or more embodiments, natural language processing can involve machine learning, neural networks, databases, rules, grammars, or Internet searches.

Also as mentioned above, and as illustrated in FIG. 2, the search manager 204 includes a semantic analyzer 212. In one or more embodiments, the semantic analyzer 212 analyzes identified key terms to identifying one or more semantically related terms for each identified key term. In some embodiments, the semantic analyzer 212 is triggered upon the user's selection of a particular key term. In other embodiments, the semantic analyzer 212 is automatically triggered upon the key term identifier's 210 identification of a key term.

In at least one embodiment, the search manager 204 offers one or more semantically related terms related to a particular key term as suggested replacement terms for that particular key term. As discussed above, semantically related terms can include hypernyms (e.g., super-types), hyponyms (e.g., sub-types), and coordinate terms (e.g., sibling-types). The semantic analyzer 212 identifies one or more semantically related terms for an identified key term by utilizing machine learning, neural networks, databases, rules, grammars, or Internet searches.

As further illustrated in FIG. 2, the search manager 204 includes an expansion suggestion manager 214. In one or more embodiments, and as mentioned above, the expansion suggestion manager 214 offers semantically related terms associated with a particular key term as suggested replacement terms for that particular key term. In response to a user selecting one or more suggested replacement terms, the expansion suggestion manager 214 includes or substitutes the selected one or more suggested replacement terms in the search query input including the particular key term.

For example, the expansion suggestion manager 214 utilizes natural language processing to insert a selected expansion suggestion into a search query input in such a way that the modified search query input remains intelligible. In one or more embodiments, the expansion suggestion manager 214 modifies a search query input based on a selected expansion suggestion by modifying the expansion suggestion prior to insertion in the search query input such that the resulting search query maintains correct grammar. For instance if the search query input is "old landmarks near me," and the selected expansion suggestion for the key term "old" is "historical," the expansion suggestion manager 214 can alter the form of the expansion suggestion to "historic." The expansion suggestion manager 214 can then substitute the key term "old" for the now-modified expansion suggestion "historic." The resulting search query input is then, "historic landmarks near me."

Furthermore, the expansion suggestion manager 214 can utilize lemmatization and pluralization in order to ensure a search query input is in the correct form. For example, in response to receiving a search query, "historic landmarks near me," and identifying an expansion suggestion "point of interest," the expansion suggestion manager 214 can alter the form of the expansion suggestion to "points of interest," prior to substituting the expansion suggestion in the search query. Similarly, the expansion suggestion manager 214 can alter the form of an expansion suggestion to make it plural or singular, depending on the form of the search query.

Furthermore, the expansion suggestion manager 214 can include appropriate connectors between two or more selected suggested replacement terms. For example, in response to a user simply tapping on two or more displayed suggested replacement terms, the expansion suggestion manager 214 can concatenate the selected suggested replacement terms with the connector "and," prior to inserting the suggested replacement terms in the search query input. In response to other types of user interactions, the expansion suggestion manager 214 can concatenate selected expansion suggestion with other connectors including, but not limited to, "not," "or," "instead of," etc.

In at least one embodiment, the expansion suggestion manager 214 utilizes natural language processing to automatically and intelligently concatenate two or more selected suggested replacement terms, regardless of user interactions. For example, if two selected suggested replacement terms are hyponyms for the same key term, the expansion suggestion manager 214 may add an "and" between the selected suggested replacement terms. If the two selected suggested replacement terms are coordinate terms, the expansion suggestion manager 214 may add an "or" between the selected suggested replacement terms, and so forth.

As mentioned above, and as illustrated in FIG. 2, the search manager 204 also includes a search query manager 216. In one or more embodiments, the search query manager 216 executes a search query based on a search query input, as the search query input is being received in real-time. For example, if a user is entering the search query input (e.g., via voice input or typed input), the search query manager 216 can automatically execute the search query input after each term in the search query input is received. Furthermore, the search query manager 216 can update the search with each modification to the search query input via the selection of one or more suggested replacement terms. In this way, the search query manager 216 provides real-time search results as the user is composing the search query input. Alternatively, in at least one embodiment, the search query manager 216 can execute a one-time search in response to a user indicating that the search query input is composed and expanded as the user desires.

In one or more embodiments, the search query manager 216 executes search queries in association with the database 226. For example, the database 226 can represent a well-defined data set (e.g., such as an electronic product catalog). In additional or alternative embodiments, the database 226 represents a plurality of networked databases. Alternatively, the search query manager 216 can execute search queries in association with the Internet, one or more private intranets, or a combination of the Internet, intranets, and one or more databases.

Also, as mentioned above, and as illustrated in FIG. 2, the search manager 204 also includes a data storage 218. The data storage 218 stores and maintains semantic data 220 representative of semantic information such as, but not limited to, semantic information databases and semantic information associated with one or more identified key terms. The data storage 218 also stores and maintains query data 222 representative of one or more search query inputs received from a user, as well as one or more suggested replacement terms associated with the one or more search query inputs. Additionally, the data storage 218 stores and maintains user data 224 representative of information associated with one or more users of the search manager 204.

Figure 3:
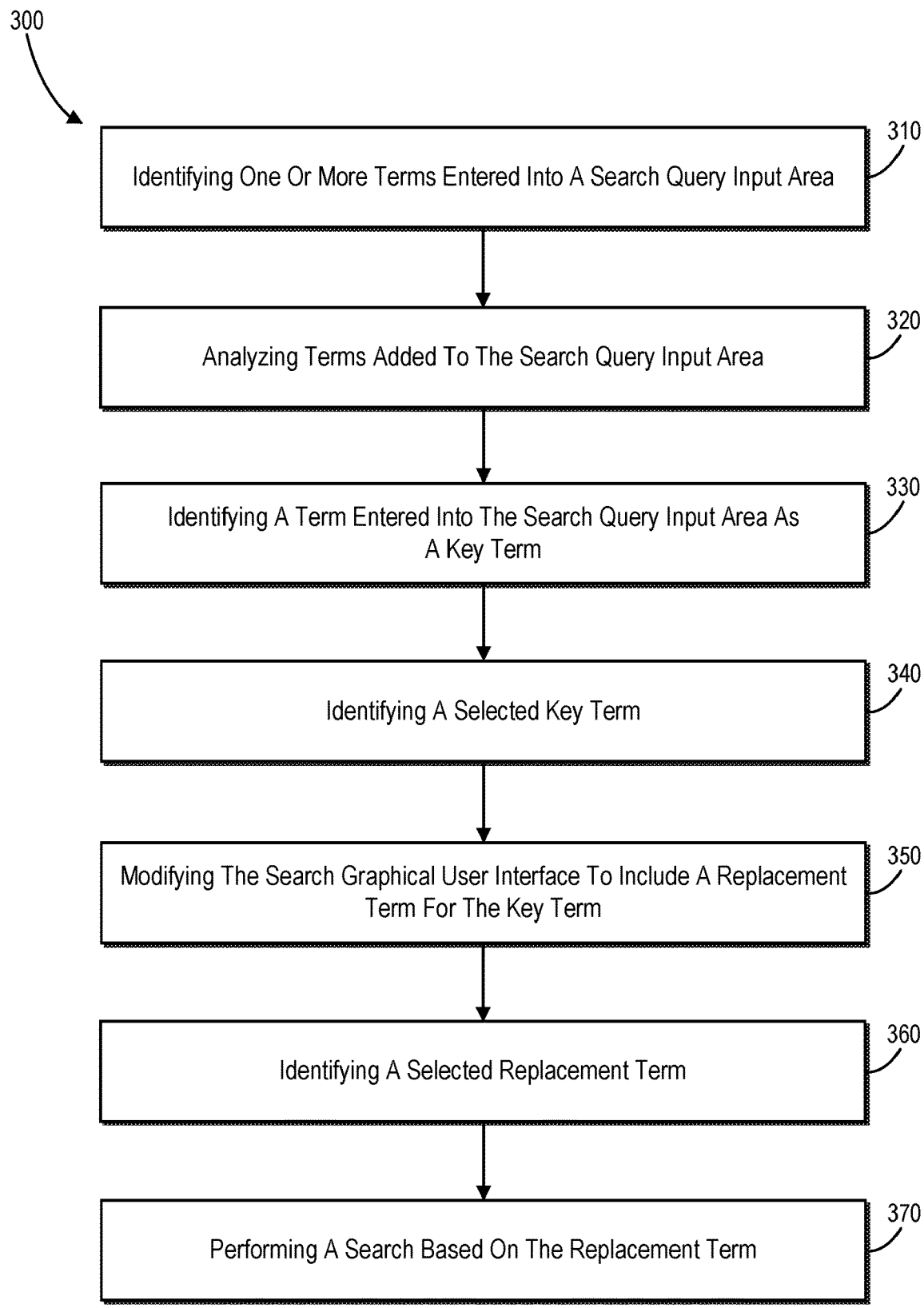
FIG. 3 illustrates a flowchart of a series of acts in a method of utilizing semantic information to compose a search query in accordance with one or more embodiments.

FIGS. 1A-2, the corresponding text, and the examples provide a number of different methods, systems, and devices for determining utilizing semantic information to create more meaningful search queries. In addition to the foregoing, embodiments can also be described in terms of flowcharts comprising acts and steps in a method for accomplishing a particular result. For example, FIG. 3 illustrates a flowchart of acts and steps in a method of utilizing semantic information in association with a search query. One will appreciate in light of the disclosure herein that the method may be performed with less or more steps or acts or the steps or acts may be performed in differing orders. Additionally, the steps or acts described herein may be repeated or performed in parallel with one another or in parallel with different instances of the same or similar steps or acts.

FIG. 3 illustrates a flowchart of one example method 300 of utilizing semantic information to compose a search query. The method 300 includes an act 310 of identifying one or more terms entered into a search query input area of a search graphical user interface (e.g., via the search query input box 106 in the search GUI 104 as illustrated in FIGS. 1A-1I). For example, act 310 can involve identifying a plurality of terms 110 entered into a search query input area 106 of a search graphical user interface 104. In at least one embodiment, the one or more terms are entered into the search query input area as a speech input.

The method 300 also includes an act 320 of analyzing terms added to the search query input area. In particular, the act 320 involves dynamically analyzing the plurality of terms 110 entered into the search query input area 106 to identify a term of the plurality of terms as a key term 112*a* based on the term being within an ontology structure of a database to be searched (e.g., such as the key terms 112*a*-112*t* as illustrated in FIGS. 1A-1I). In one or more embodiments, dynamically analyzing terms added to the search query input area includes: analyzing the terms for one or more parts of speech, analyzing the terms for subject-predicate-object groupings, and analyzing the terms for adjective-noun pairs and adverb-verb pairs.

Additionally, the method 300 includes an act 330 of identifying a term entered into the search query input area as a key term. In particular, the act 330 involves, performing certain actions upon identifying a term entered into the search query input area as a key term based on the term being present in the ontology structure. In one or more embodiments, the performed actions include identifying a plurality of suggested replacement terms for the key term from the ontology structure.

For example, in one or more embodiments, identifying the plurality of suggested replacement terms for the key term includes: analyzing the one or more terms for one or more parts of speech, analyzing the one or more terms for subject-predicate-object groupings, and analyzing the one or more terms for adjective-noun pairs and adverb-verb pairs. Alternatively or additionally, identifying the plurality of suggested replacement terms for the key term can include identifying one or more expansion terms that are semantically related to the key term. In that embodiment, identifying one or more expansion terms that are semantically related to the key term includes identifying one or more of hypernyms of the key term, hyponyms of the key term, or coordinate terms of the key term. In some embodiments, identifying the plurality of suggested replacement terms for the key term includes identifying terms on a level of the ontology structure that the key term is found. Additionally or alternatively, identifying the plurality of suggested replacement terms for the key term comprises identifying terms on a level of the ontology structure adjacent to a level of the ontology structure in which the key term is found.

Additionally, in at least one embodiment, upon identifying a term entered into the search query input area as a key term based on the term being present in the ontology structure, the act 330 optionally includes modifying a visual appearance of the key term in the search query input area. For example, in one or more embodiments, modifying the visual appearance of the key term includes one or more of highlighting the key term, changing the font of the key term, and changing the text color of the key term.

Furthermore, the method 300 includes an act 340 of identifying a selected key term. In particular, the act 340 involves identifying user input selecting the key term (e.g., as illustrated in FIGS. 1A-1I). For example, in one or more embodiments, identifying first user input selecting the key term includes identifying a user touch gesture associated with the key term.

The method 300 also includes an act 350 of modifying the search graphical user interface to include a replacement term for the key term. In particular, the act 350 involves, in response to the user input selecting the key term, modifying the search graphical user interface to include the identified plurality of suggested replacement terms for the key term (e.g., via the expansion suggestion area 116 of the search GUI 104 shown in FIGS. 1C-1I). In at least one embodiment, modifying the search graphical user interface includes adding a display area for suggested replacement terms adjacent to the key term.

The method 300 further includes an act 360 of identifying a selected replacement term. In particular, the act 360 involves identifying second user input selecting a suggested replacement term. For example, in one or more embodiments, identifying user input selecting a suggested replacement term is via a touch display input.

Furthermore, the method 300 includes an act 370 of performing a search based on the replacement term. In particular, the act 370 involves performing a search using the suggested replacement term based on a second user input selecting a suggested replacement term of the plurality of suggested replacement terms. In one embodiment, performing the search using the suggested replacement term comprises generating a modified search query by substituting the selected replacement term for the key term and performing the search using the generated modified search query. In additional or alternative embodiments, performing the search using the suggested replacement term comprises generating a modified search query by adding the selected replacement term to the one or more terms entered into the search query input area and performing the search using the generated modified search query.

Additionally, in some embodiments, the method 300 includes acts of semantically analyzing the one or more terms entered into the search query input area to determine that the key term is a first part of speech, wherein identifying a plurality of suggested replacement terms for the key term includes identifying suggested replacement terms based on the key term being the first part of speech. In that embodiment, the method 300 can also include acts of identifying an additional term entered into the search query input area, re-semantically analyzing the terms in the search query input area in response to the additional term being entered into the search query input area, determining that the key term has changed from the first part of speech to a second part of speech, and identifying a revised plurality of suggested replacement terms for the key term based on the key term being the second part of speech.

Figure 4:
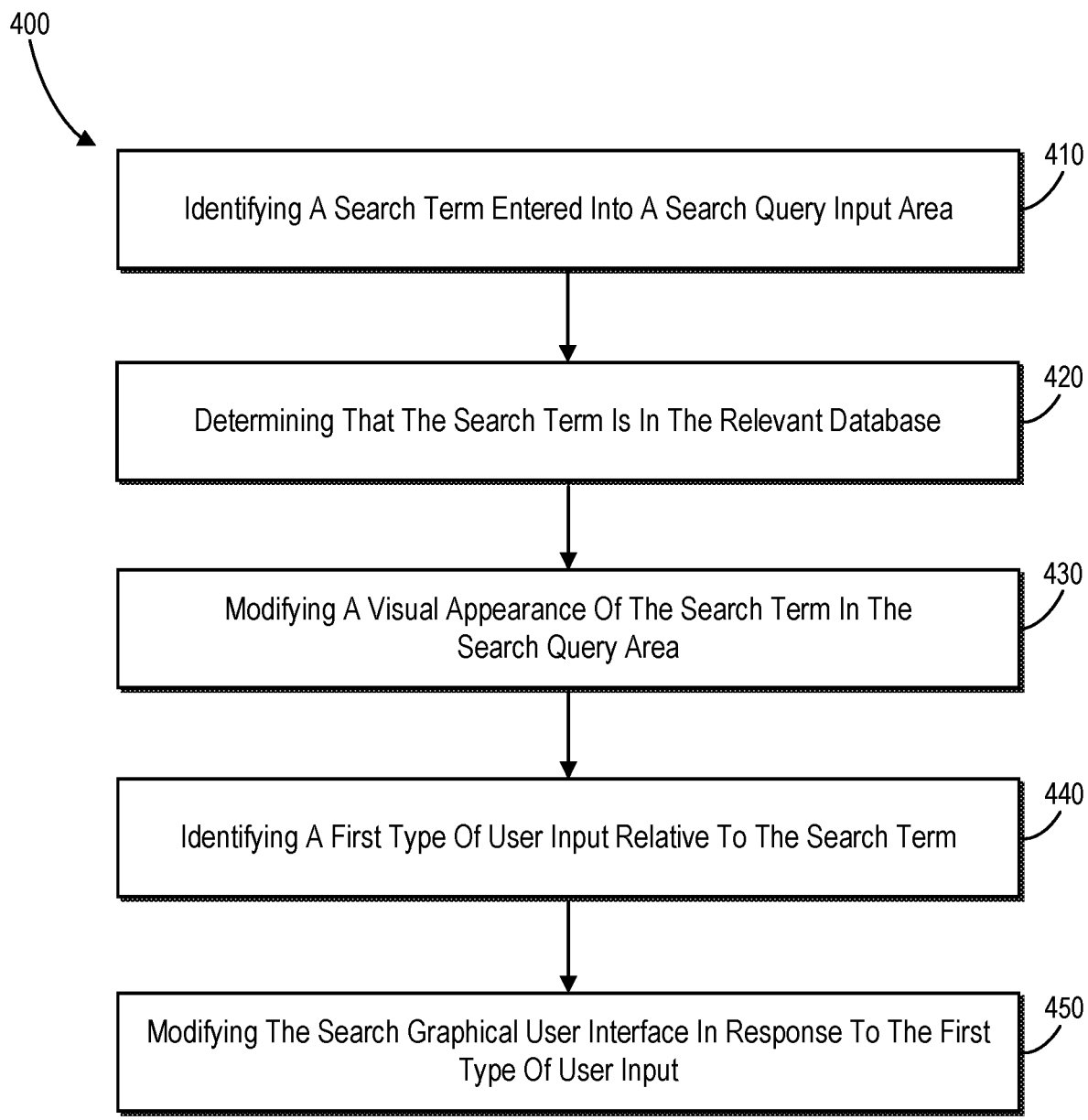
FIG. 4 illustrates a flowchart of a series of acts in another method of utilizing semantic information to compose a search query in accordance with one or more embodiments.

FIG. 4 illustrates a flowchart of another example method 400 of utilizing semantic information to compose a search query. The method 400 includes an act 410 of identifying a search term entered into a search query input area. In particular, the act 410 involves identifying a search term entered into a search query input area of a search graphical user interface for searching a database (e.g., the search query input 110 received via the search query input box 106 in the search GUI 104 as illustrated in FIG. 1A).

The method 400 also includes an act 420 of determining that the search term is in the relevant database. In particular, the act 420 involves determining that the search term is in an ontology structure of the database. For example, in one or more embodiments, determining that the search term is in an ontology structure of the database includes utilizing semantic information to identify which of a plurality of instances of the search term in the ontology structure most closely corresponds to a use of the search term in the search query input area.

Furthermore, the method 400 includes an act 430 of modifying a visual appearance of the search term in the search query input area. In particular, the act 430 involves modifying a visual appearance of the search term in the search query input area in response to determining that the search term is in the ontology structure of the database. In one or more embodiments, modifying a visual appearance of the search term in the search query input area includes one or more of highlighting the search term, changing the color of the search term, adding a border around the search term, or changing a background color behind the search term.

Additionally, the method 400 includes an act 440 of identifying a first type of user input relative to the search term. In particular, the act 440 involves identifying a first type of user input relative to the modified search term (e.g., the expansion suggestion control 118c as shown in FIG. 1C). In one or more embodiments, identifying a first type of user input relative to the modified search term includes identifying a touch gesture adjacent to the modified search term. In additional or alternative embodiments, identifying a first type of user input involve identifying user input relative to a timeline control, a color swatch control, or any other type of control for displaying the modified search term.

The method 400 also includes an act 450 of modifying the search graphical user interface in response to the first type of user input. In particular, the act 450 involves, in response to the first type of user input relative to the search term, modifying the search graphical user interface to include a plurality of suggested replacement terms for the search term from a first level of the ontology structure (e.g., as shown in FIG. 1D). In some embodiments, the method 400 also includes an act of identifying the plurality of suggested replacement terms by determining one or more hypernyms of the search term, hyponyms of the search term, or coordinate terms of the search term. Furthermore, the method 400 can include acts of identifying user input selecting a suggested replacement term, and performing a search using the suggested replacement term.

Additionally, in one or more embodiments, the method 400 includes further acts of identifying a second type of user input relative to the modified search term, and in response to the second type of user input relative to the search term, modifying the search graphical user interface to include a plurality of suggested replacement terms for the search term from a second level of the ontology structure. For example, in some embodiments, the first type of user input comprises a tap or press, and the first level of the ontology structure includes a level at which the search term is located within the ontology structure. Additionally, in some embodiments, the second type of user input includes a swipe up or a swipe down, and the second level of the ontology structure includes a level above or below the level on which the search term is located within the ontology structure.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
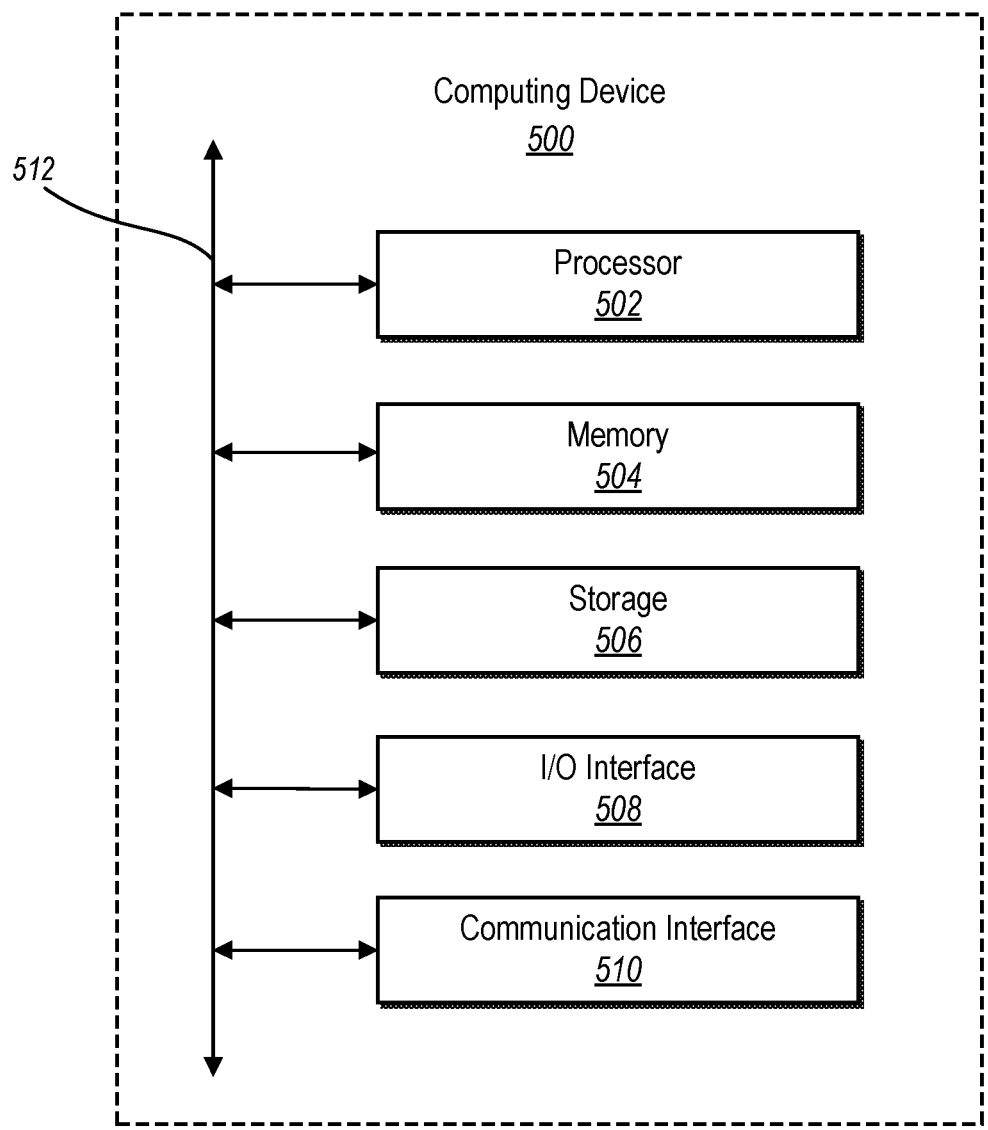
FIG. 5 illustrates a block diagram of an exemplary computing device in accordance with one or more embodiments.

FIG. 5 illustrates a block diagram of an exemplary computing device 500 that may be configured to perform one or more of the processes described above. One will appreciate that one or more computing devices such as the computing device 500 may implement the search management system. As shown by FIG. 5, the computing device 500 can comprise a processor 502, memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In particular embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In particular embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, the storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In particular embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from the computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 6:
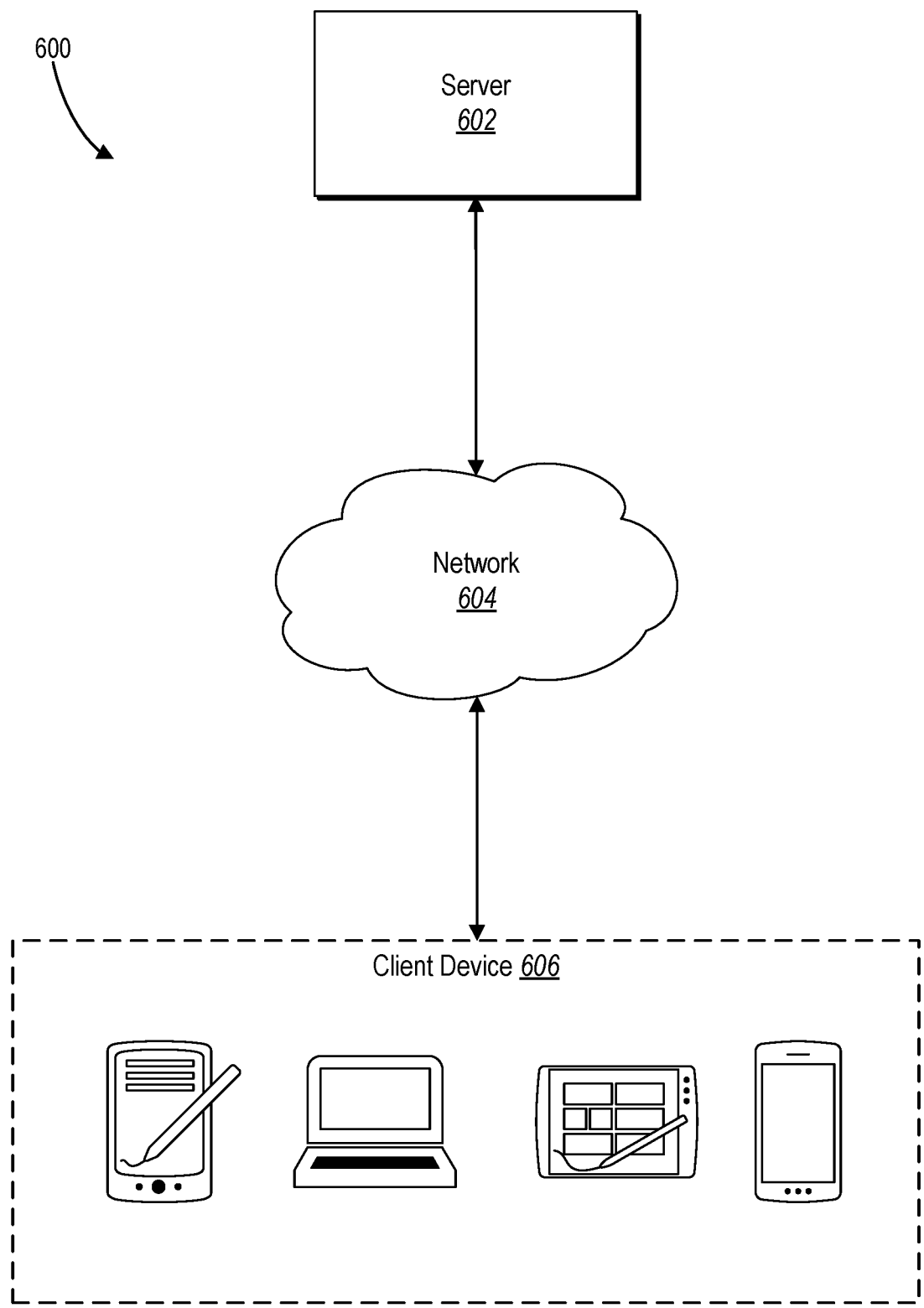
FIG. 6 is an example network environment in which the digital content creation/editing system can operate in accordance with one or more embodiments.

FIG. 6 illustrates an example network environment 600 of in which the search management system can operate. The network environment 600 includes a client system 606, and a server 602 connected to each other by a network 604. Although FIG. 6 illustrates a particular arrangement of the client system 606, the server 602, and the network 604, this disclosure contemplates any suitable arrangement of the client system 606, the server 602, and the network 604. As an example and not by way of limitation, the client system 606 and the server 602 may be connected to each other directly, bypassing network 604. As another example, the client system 606 and the server 602 may be physically or logically co-located with each other in whole or in part. Moreover, although FIG. 6 illustrates a particular number of client systems 606, servers 602, and networks 604, this disclosure contemplates any suitable number of client systems 606, servers 602, and networks 604. As an example and not by way of limitation, network environment 600 may include multiple client system 606, servers 602, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client system 606 and the server 602 to the communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client system 606 may be an electronic device including hardware, software, or embedded logic components or a combination of two or more such components and capable of carrying out the appropriate functionalities implemented or supported by client system 606. As an example and not by way of limitation, a client system 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 606. A client system 606 may enable a network user at client system 606 to access network 604. A client system 606 may enable its user to communicate with other users at other client systems 606.

In particular embodiments, client system 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 606 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 606 one or more Hyper Text Markup Language (HTML) files responsive to the HTTP request. Client system 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 602 may be capable of linking a variety of entities. As an example and not by way of limitation, server 602 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 602. In particular embodiments, however, the server 602 and third-party systems may operate in conjunction with each other to provide analytics services to users of the server 602 or third-party systems. In this sense, server 602 may provide a platform, or backbone, which other systems, such as third-party systems, may use to provide analytic or data or tracking services and functionality to users across the Internet.

In particular embodiments, a third-party system may include a third-party content object provider. A third-party content object provider may include one or more sources of content objects, which may be communicated to a client system 606. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 602 may include a variety of servers, sub-systems, programs, modules, logs, and data stores. In particular embodiments, server 602 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Server 602 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system for dynamically analyzing search queries to provide potential search query modifications via interactive user-interfaces comprising:
at least one processor; and
at least one non-transitory computer-readable storage medium storing instructions thereon that, when executed by the at least one processor, cause the system to:
receive a first portion of a search query via a search interface;
analyze the first portion of the search query to identify and provide a plurality of suggested replacement terms for a first key term in the first portion of the search query;
receive a selection of at least one suggested replacement term of the plurality of suggested replacement terms;
modify the search query to include the at least one suggested replacement term and to exclude the first key term;
perform a search using the modified search query to identify a first plurality of search results;
modify the search interface to include the first plurality of search results;
receive a second portion of the search query;
semantically re-analyze the modified search query and the second portion of the search query to identify and provide a second plurality of suggested replacement terms for a second key term;
receive a selection of a suggested replacement term of the second plurality of suggested replacement terms;
modify, in response to the selection of the suggested replacement term, the search query to include the suggested replacement term and exclude the second key term;
perform an updated search using the modified search query to identify an updated plurality of search results; and
modify the search interface to include the updated plurality of search results.

2. The system as recited in claim 1, further comprising:
in response to analyzing the first portion of the search query to identify and provide a plurality of suggested replacement terms for a first key term in the first portion of the search query, modifying a visual appearance of the first key term; and
in response to semantically re-analyzing the modified search query and the second portion of the search query to identify and provide a second plurality of suggested replacement terms for a second key term, modifying a visual appearance of the second key term.

3. The system as recited in claim 1, wherein analyzing the first portion of the search query to identify and provide a plurality of suggested replacement terms for a first key term in the first portion of the search query comprises accessing a database to be searched comprising a plurality of database terms within an ontology structure that, for one or more database terms, includes a database term, at least one hypernym associated with the database term, at least one hyponym associated with the database term, and at least one coordinate term associated with the database term.

4. The system as recited in claim 3, wherein analyzing the first portion of the search query to identify and provide a plurality of suggested replacement terms for a first key term further comprises:

analyzing the first portion of the search query for parts of speech;
analyzing the first portion of the search query for subject-predicate-object groupings; and
analyzing the first portion of the search query for adjective-noun pairs and adverb-verb pairs.

5. The system as recited in claim 4, wherein a hypernym of the first key term has a superordinate relationship with the first key term within an associated ontology structure, a hyponym of the first key term has a subordinate relationship with the first key term within the associated ontology structure, and a coordinate term of the first key term shares at least one hypernym with the first key term within the associated ontology structure.

6. The system as recited in claim 1, further comprising:
identifying a first type of user input relative to the first key term; and
wherein analyzing the first portion of the search query to identify and provide a plurality of suggested replacement terms for a first key term in the first portion of the search query in response to identifying the first type of user input relative to the first key term.

7. The system as recited in claim 6, further comprising:
identifying a second type of user input relative to the second key term; and
providing the second plurality of suggested replacement terms comprising a hypernym of the second key term and a coordinate term of the second key term.

8. The system as recited in claim 1, wherein:
modifying the search query to include the suggested replacement term and exclude the second key term further comprises determining that the first key term has changed from a first part of speech to a second part of speech; and
performing the updated search using the modified search query is based on the first key term changing from the first part of speech to the second part of speech.

9. A method for dynamically analyzing search queries to provide potential search query modifications via interactive user-interfaces comprising:
receiving a first portion of a search query via a search interface;
analyzing the first portion of the search query to identify and provide a plurality of suggested replacement terms for a first key term in the first portion of the search query;
modifying the search query to include at least one suggested replacement term selected from the plurality of suggested replacement terms;
modifying the search interface to include a first plurality of search results resulting from performing a search using the modified search query;
receiving a second portion of the search query via the search interface;
semantically re-analyzing the modified search query and the second portion of the search query to identify and provide a second plurality of suggested replacement terms for a second key term;
modifying, in response to a detected selection of a suggested replacement term of the second plurality of suggested replacement terms, the search query to include the suggested replacement term and exclude the second key term; and
modifying the search interface to include an updated plurality of search results resulting from performing an updated search using the modified search query.

10. The method as recited in claim 9, further comprising:

in response to analyzing the first portion of the search query to identify and provide a plurality of suggested replacement terms for a first key term in the first portion of the search query, modifying a visual appearance of the first key term; and
in response to semantically re-analyzing the modified search query and the second portion of the search query to identify and provide a second plurality of suggested replacement terms for a second key term, modifying a visual appearance of the second key term.

11. The method as recited in claim 10, wherein analyzing the first portion of the search query to identify and provide a plurality of suggested replacement terms for a first key term in the first portion of the search query comprises accessing a database to be searched comprising a plurality of database terms within an ontology structure that, for one or more database terms, includes a database term, at least one hypernym associated with the database term, at least one hyponym associated with the database term, and at least one coordinate term associated with the database term.

12. The method as recited in claim 11, wherein analyzing the first portion of the search query to identify and provide a plurality of suggested replacement terms for a first key term further comprises:
analyzing the first portion of the search query for parts of speech;
analyzing the first portion of the search query for subject-predicate-object groupings; and
analyzing the first portion of the search query for adjective-noun pairs and adverb-verb pairs.

13. The method as recited in claim 12, wherein a hypernym of the first key term has a superordinate relationship with the first key term within an associated ontology structure, a hyponym of the first key term has a subordinate relationship with the first key term within the associated ontology structure, and a coordinate term of the first key term shares at least one hypernym with the first key term within the associated ontology structure.

14. The method as recited in claim 10, further comprising:
identifying a first type of user input relative to the first key term; and
wherein analyzing the first portion of the search query to identify and provide a plurality of suggested replacement terms for a first key term in the first portion of the search query in response to identifying the first type of user input relative to the first key term.

15. The method as recited in claim 14, further comprising:
identifying a second type of user input relative to the second key term; and
providing the second plurality of suggested replacement terms comprising a hypernym of the second key term and a coordinate term of the second key term.

16. The method as recited in claim 15, wherein:
modifying the search query to include the suggested replacement term and exclude the second key term further comprises determining that the first key term has changed from a first part of speech to a second part of speech; and
modifying the search interface to include the updated plurality of search results resulting from performing the updated search using the modified search query is based on the first key term changing from the first part of speech to the second part of speech.

17. A non-transitory computer-readable storage medium storing instructions thereon that, when executed by at least one processor, cause a computing system to:

receive a first portion of a search query via a search interface;
analyze the first portion of the search query to identify and provide a plurality of suggested replacement terms for a first key term in the first portion of the search query;
modify the search query to include at least one suggested replacement term selected from the plurality of suggested replacement terms;
modify the search interface to include a first plurality of search results resulting from performing a search using the modified search query;
receive a second portion of the search query via the search interface;
semantically re-analyze the modified search query and the second portion of the search query to identify and provide a second plurality of suggested replacement terms for a second key term;
modify, in response to a detected selection of a suggested replacement term of the second plurality of suggested replacement terms, the search query to include the suggested replacement term and exclude the second key term; and
modify the search interface to include an updated plurality of search results resulting from performing an updated search using the modified search query.

18. The non-transitory computer-readable storage medium as recited in claim 17, wherein analyzing the first portion of the search query to identify and provide a plurality of suggested replacement terms for a first key term in the first portion of the search query comprises accessing a database to be searched comprising a plurality of database terms within an ontology structure that, for one or more database terms, includes a database term, at least one hypernym associated with the database term, at least one hyponym associated with the database term, and at least one coordinate term associated with the database term.

19. The non-transitory computer-readable storage medium as recited in claim 18, wherein analyzing the first portion of the search query to identify and provide a plurality of suggested replacement terms for a first key term further comprises:
analyzing the first portion of the search query for parts of speech;
analyzing the first portion of the search query for subject-predicate-object groupings; and
analyzing the first portion of the search query for adjective-noun pairs and adverb-verb pairs.

20. The non-transitory computer-readable storage medium as recited in claim 19, wherein a hypernym of the first key term has a superordinate relationship with the first key term within an associated ontology structure, a hyponym of the first key term has a subordinate relationship with the first key term within the associated ontology structure, and a coordinate term of the first key term shares at least one hypernym with the first key term within the associated ontology structure.

* * * * *